United States Patent [19]
Deppert et al.

[11] Patent Number: 5,358,456
[45] Date of Patent: Oct. 25, 1994

[54] GEAR UNIT FOR COMBINATION WITH AN AUXILIARY POWER CONSUMING UNIT OF A MOTOR-VEHICLE

[75] Inventors: Reinhard Deppert, Gochsheim; Manfred Lutz, Schweinfurt; Walter Kurz, Durach; Wolfgang Baier, Obbach, all of Fed. Rep. of Germany

[73] Assignee: Fichtel & Sachs AG, Schweinfurt, Fed. Rep. of Germany

[21] Appl. No.: 985,594

[22] Filed: Dec. 3, 1992

Related U.S. Application Data

[63] Continuation-in-part of Ser. No. 893,644, Jun. 5, 1992, which is a continuation-in-part of Ser. No. 893,924, Jun. 4, 1992, abandoned.

[30] Foreign Application Priority Data

Jun. 7, 1991 [DE]  Fed. Rep. of Germany ....... 4118853

[51] Int. Cl.$^5$ ............................................. F16H 3/44
[52] U.S. Cl. ........................................ 475/154; 475/159
[58] Field of Search .............................. 475/154, 159

[56] References Cited

U.S. PATENT DOCUMENTS

| | | | |
|---|---|---|---|
| 2,327,769 | 8/1943 | Claytor | 74/290 |
| 2,795,155 | 6/1957 | Bade | 475/159 |
| 2,943,517 | 7/1960 | Markley et al. | 475/159 |
| 3,277,746 | 10/1966 | Forester et al. | 475/159 |
| 3,702,084 | 11/1972 | Kepple et al. | 475/159 |
| 4,265,135 | 5/1981 | Smirl | 74/336 B |
| 4,644,824 | 2/1987 | Shimizu | 74/781 R |
| 4,738,163 | 4/1988 | Anderson et al. | 475/154 |
| 5,147,254 | 9/1992 | Baier et al. | 475/121 |

FOREIGN PATENT DOCUMENTS

| | | |
|---|---|---|
| 2801812 | 7/1979 | Fed. Rep. of Germany . |
| 2951742 | 7/1981 | Fed. Rep. of Germany . |
| 3103397 | 8/1982 | Fed. Rep. of Germany . |
| 3510549 | 10/1985 | Fed. Rep. of Germany . |
| 3523999 | 2/1986 | Fed. Rep. of Germany . |
| 3508808 | 3/1989 | Fed. Rep. of Germany . |
| 3819986 | 12/1989 | Fed. Rep. of Germany . |
| 4036209 | 5/1992 | Fed. Rep. of Germany . |
| 2414626 | 8/1979 | France . |
| 2628810 | 9/1989 | France . |
| 2677417 | 12/1992 | France . |
| 9105184 | 4/1991 | PCT Int'l Appl. . |
| 2012890 | 8/1979 | United Kingdom . |
| 2121127 | 12/1983 | United Kingdom . |
| 2148421 | 5/1985 | United Kingdom . |
| 2156016 | 10/1985 | United Kingdom . |
| 2213217 | 8/1989 | United Kingdom . |

*Primary Examiner*—Dirk Wright
*Attorney, Agent, or Firm*—Brumbaugh, Graves, Donohue & Raymond

[57] ABSTRACT

According to an illustrative embodiment of the invention, a planetary gear box is combined with an electric generator of a motor-vehicle. The planetary gear box comprises a free wheel and a gear change clutch. Such, the transmission ratio of the planetary gear box is changeable. The components of the gear box are arranged at least partially in axially overlapping relationship so that a small overall axial dimension is obtained.

93 Claims, 6 Drawing Sheets

GEAR UNIT FOR COMBINATION WITH AN AUXILIARY POWER CONSUMING UNIT OF A MOTOR-VEHICLE

CROSS REFERENCE TO RELATED APPLICATIONS

This is a continuation-in-part of U.S. application Ser. No. 7/893,644, filed Jun. 5, 1992, which in turn is a continuation-in-part of U.S. application Ser. No. 07/893,924, filed Jun. 4, 1992, now abandoned.

BACKGROUND OF THE INVENTION

This invention refers to a gear unit for combination with an auxiliary power consuming unit of a motor-vehicle. An example of such an auxiliary power consuming unit is an electric power generator which is to be driven from the internal combustion engine of a motor-vehicle. Another example of an auxiliary power consuming unit is an air compressor or an oil pump. Such auxiliary power consuming units should be driven with a substantially constant r.p.m., in order to be most effective.

Internal combustion engines of motor-vehicles have highly varying r.p.m. in operation. This means that an auxiliary power consuming unit driven by the internal combustion engine receives highly varying input r.p.m. from the internal combustion engine.

It is, therefore, desirable to equalize the r.p.m. of the auxiliary power consuming units in spite of the varying r.p.m. of the internal combustion engine driving the respective auxiliary power consuming unit.

STATEMENT OF THE PRIOR ART

From German Patent Publication 35 23 999 a gear unit is known in combination with an electric power generator. This gear unit comprises a planetary gear drive in combination with a free wheel and an electro-magnetic clutch. The input shaft of the gear unit is provided with a belt pulley driven through a belt from the internal combustion engine. In this known gear unit, the belt pulley drives a planetary wheel carrier. The sun wheel is connected with the input shaft of the generator. A free wheel unit is provided between the ring wheel and the sun wheel. The ring wheel can be prevented from rotation or released for rotation by the electro-magnetic clutch. When the ring wheel is prevented from rotation, the sun wheel is driven with an increased r.p.m. as compared with the r.p.m. of the belt pulley, while the free wheel allows relative rotation of the sun wheel and the ring wheel. When the electro-magnetic clutch releases the ring wheel for rotation, the free wheel unit locks the planetary gear unit such that the sun wheel rotates with the same r.p.m. as the belt pulley. In this known gear unit, the components are arranged in substantially three planes side by side. The belt pulley is provided in a first plane, the planetary gear unit is arranged in a second plane, and the electro-magnetic clutch is arranged in a third plane. This construction requires much space, particularly in axial direction. Therefore, it is difficult to accommodate such a gear unit in combination with a respective generator within the motor space of a modern vehicle. The gear unit is not encapsulated. Noises are not damped. The possibility of an oil bath is mentioned, but there is no disclosure how to provide such an oil bath. The r.p.m. relationship for the direct drive on the one hand and the fast drive on the other hand is rather large and is not acceptable for some applications.

From German Patent Publication 29 51 742 a further gear unit for combination with an auxiliary power consuming unit is known. This gear unit again has a direct drive and a fast drive selectable by a centrifugal clutch. A disadvantage of this known construction is that the wheels of the planetary gear unit are always rotating even in the direct drive condition. As a result thereof, noises occur at high r.p.m. of the driving internal combustion engine. Moreover, the automatic change by a centrifugal clutch involves problems, particularly in city operation.

OBJECT OF THE INVENTION

It is a first object of the present invention to provide a gear unit which requires a minimum of space adjacent a respective auxiliary power consuming unit. A further object is to provide a gear unit which can be changed between different modes of operation by external control. A still further object is to provide a gear unit in which the components of the planetary gear are at rest, when the gear unit is driven with high r.p.m. from the respective combustion engine. A still further object of the invention is that at low r.p.m. of the driving combustion engine, an increased transmission ratio can be smoothly obtained. A still further object of the invention is that the gear unit is sealed with respect to the surrounding space and can be provided with a volume of lubricant. A still further object of the invention is to allow preassembling of substantially all components of the gear unit such that the preassembled unit can be combined with the respective auxiliary power consuming unit both in the plant of the manufacturers and in repair and replacement situations.

SUMMARY OF THE INVENTION

A gear unit is provided for combination with an auxiliary power consuming unit of a motor-vehicle. The auxiliary power unit has stator means and an auxiliary unit input shaft with an axis. The gear unit comprises in a substantially annular arrangement about the axis a gear unit input member, a gear unit output member, planetary gear means including a sun wheel, a ring wheel, a planetary wheel carrier and at least one planetary wheel on the planetary wheel carrier. The gear unit further comprises free wheel means, a gear change clutch controllable by external control means and a lubricant chamber containing a liquid lubricant for lubrication of engagement faces of components of said gear unit which are movable with respect to each other in operation. The gear unit output member is adapted for being connected for common rotation with the auxiliary unit input shaft in substantial alignment therewith along the axis. The above-mentioned components of the gear unit are arranged such as to require only a small space adjacent the auxiliary power consuming unit at least in axial direction when the gear unit is combined with the auxiliary power consuming unit.

It has been found that a most compact gear unit can be obtained if the gear unit input member is continously in driving connection with the planetary wheel carrier, if the ring wheel is adapted for continuous driving connection with the gear unit output member, if the gear change clutch is adapted for selectively either preventin a rotation of the sun wheel with respect to the stator means or releasing the sun wheel for rotation about the axis with respect to the stator means. In such case the free wheel means permits rotation of the gear unit output member with respect to the gear unit input member in a predetermined sense of rotation in response to the gear change clutch preventing the sun wheel from rotation with respect to the stator means. On the other hand the free wheel means transmits an input torque from the gear unit input member to the gear unit output member in the predetermined sense of rotation in response to the gear change clutch releasing the sun wheel for rotation about the axis with respect to the stator means.

This basic working priciple is a prerequisite for having the components of the planetary gear and the respective bearing means at rest in the direct or 1:1 transmission, This means that at high r.p.m. of the combustion engine the planetary gear system is at a rest.

Starting from the above system the gear unit input member may be shaped as a gear unit input sleeve extending axially through the sun wheel and having a first end portion adjacent to the stator means and a second end portion remote from the stator means, The gear unit output member may extend axially through the gear unit input member and have a first end portion adjacent to the stator means and a second end portion remote from the stator means.

The gear unit output member may be adapted for being fastened to the auxliary unit input shaft, The gear unit input member may be axially fixed and rotatably mounted on the gear unit output member about the axis. The planet wheel carrier may be mounted for common rotation on the gear unit input member adjacent the first end portion of the gear unit input member axially between the sun wheel and the stator means. The ring wheel may be fixable on the gear unit output member adjacent the first end portion thereof by a ring wheel support member located axially between the planet wheel carrier and the stator means. The second end portion of the gear unit input member may be provided with a drive means engagement face about the axis.

The drive means engagement face may be e.g. a belt pulley. By these design features a further reduction in axial length can be obtained.

Still further reduction in axial space can be obtained if the sun wheel has a first axial end portion adjacent the stator means and a second axial end portion remote from the stator means. In this case the second axial end portion of the sun wheel may be connected for common rotation with a sun wheel stop member. This sun wheel stop member may be rotatably mounted and axially fixed on a radially outer surface of the gear unit input member. This sun wheel stop member carries a first clutch portion of the gear change clutch, while a second portion of the gear change clutch may be fastened or adapted for being fastened to the stator means.

A most helpful design feature for obtaining further reduction in the axial length consists in that the sun wheel stop member has a radially outward extending flange member, said flange member carrying the first portion of the gear change clutch unit. This first portion of the gear change clutch may be frictionally engageable with the second portion of the gear change clutch. The first portion of the gear change clutch may be axially movable with respect to the flange member, such as to obtain engagement of the clutch portions without axial movement of the flange member.

The gear change clutch may be an electro-magnetically controlled clutch. Alternatively it is also possible to use fluid operated clutches. In any case the clutch should be controllable from a control unit remote from the gear unit such that clutch actuation can be made arbitrarily. In using such a control unit a necessary hysteresis can be provided by the control unit for avoiding multiple gear change at a predetermined r.p.m. of the gear unit input member. The second portion of the gear change clutch may comprise an electromagnetic coil unit and the first portion of the gear change clutch may comprise an armature.

The ring wheel support member may be adapted for being clamped between the first end portion of the gear unit output member and an axially directed abutment face provided on the auxiliary unit input shaft in axially fixed relation thereto. Releasable clamping means may be provided for axially urging the gear unit output member against the ring wheel support member and the ring wheel support member against the abutment face. Such the assembly of the gear unit is completed when the gear unit is combined with the auxiliary power consuming unit.

The ring wheel support member may be a first housing portion of a chamber housing confining the lubricant chamber and accomodating the planetary gear means. This first housing portion may be located adjacent a first axial end portion of the sun wheel nearer to the stator means. The chamber housing may be completed by a second housing portion more remote from the stator means and adjacent a second end portion of the sun wheel. Such a compact housing may be provided around the planetary gear means. The second housing portion may be located axially between the flange member and the second end portion of said sun wheel.

For sealing the lubricant chamber the second housing portion may be in rotatable sealing engagement with the sun wheel stop member and the sun wheel stop member may be in rotatable sealing engagement with the gear unit input member.

The free wheel means may be located radially between the gear unit input member and the gear unit output member substantially in radial alignment with the sun wheel. This is of high advantage for obtaining an axially short design because the free wheels are substantially in the same plane as the planetary gear means.

Alternativley, the free wheel means may be located radially between a radially outer circumferential face of the planetary wheel carrier and a radially inward circumferential face of the ring wheel support member on a side of the ring wheel support member remote from the stator means. This results also in a very compact design particularly when taking into consideration that the wheel support member may be adapted in shape to a convex end face of an electric power generator. More particularly, the free wheel means may be located radially outwards of planet wheel mounting bolts fastened to the planet wheel carrier.

The gear unit input member may be rotatably mounted on the gear unit output member by first roller means adjacent the first end portions of the gear unit input member and the gear unit output member and by second roller means adjacent the second end portion of the gear unit input member and the gear unit output member.

This results in a very stable construction in which the belt pulley adjacent the second end portion of the gear unit input member resists bending forces resulting from a belt tension. For obtaining utmost stability it is desirable to use a sleeve-shaped gear unit output member such that the input shaft of the auxiliary power consuming unit can be extended through at least part of the axial length of the gear unit output member.

In view of the aim of short axial construction it is desirable that the first roller means are substantially in radial alignment with the sun wheel.

At least one of the first and second roller means may be adapted for axially positioning the gear unit input member and the gear unit output member with respect to each other in axial direction. For example the at least one roller means may be the first roller means and these first roller means can be ball bearing means.

Further the sun wheel stop member may be rotatably mounted on the gear unit input member by roller means. These roller means mounting the sun wheel stop member on the gear unit input member may be ball bearing means adapted for axially positioning the sun wheel stop member with respect to the gear unit input member.

For sealing the lubricant chamber the sun wheel stop member may be sealingly engaged with the gear unit input member at a location more remote from the stator means than the ball bearing means mounting the sun wheel stop member on the gear unit input member. Such these ball bearing means are also accessible to the lubricant.

The gear unit input member may be rotatably mounted on the gear unit output member by at least one roller bearing means comprising a group of roller members circularly arranged about the axis. These roller members may be in direct rolling engagement with respective rolling tracks of the gear unit input member and the gear unit output member. Further the sun wheel stop member may be rotatably mounted on the gear unit input member by at least one roller bearing means comprising a group of roller members circularly arranged about the axis. Also this group of roller members may be in direct rolling engagement with respective roller tracks of the gear unit input member and the sun wheel stop member.

By using the above-mentioned special form of roller bearings the radial and axial dimensions can be further reduced as compared with using complete conventional roller bearings with inner and outer ring members. Incidently, the term roller member should be understood to include both, ball members and cylindrical roller members.

The sun wheel, said at least one planetary wheel and the ring wheel may be accommodated within a lubricant chamber, which is confined by a chamber housing and sealed by rotatable sealing means. This chamber housing has radially outer housing wall means. The gear change clutch may be at least partially located radially outwards the radially outer housing wall means and in axially overlapping relationship therewith. Such the axial length can be further reduced. The electro-magnetic clutch can be arranged substantially in the same plane as the planetary gear means.

The lubricant chamber is preferably formed as an annular chamber about the axis and accommodates at least one of the planetary gear means and the free wheel means. This annular chamber is rotatable about the axis in response to rotation of the gear unit input member. Such the liquid lubricant in the lubricant chamber forms a lubricant ring adjacent the radially outer wall means of the lubricant chamber in response to centrifugal forces. Lubricant conveying means may be located within the lubricant chamber for conveying lubricant from the lubricant ring towards engagement faces of respective components of the gear unit which are movable with respect to each other.

The lubricant conveying means may comprise a lubricant pick-up tube having a radially outer end entering into the lubricant ring and having pick-up means directed in substantially circumferential direction about the axis. This pick-up tube is rotated with respect to the lubricant chamber, such as to pick-up lubricant by the effect of pitot pressure conveying the lubricant to the places where it is needed.

The relative rotation of the lubricant ring and the pick-up tube may be obtained in that the lubricant chamber is confined by a chamber housing mounted for common rotation with the ring wheel while the pick-up tube is connected for common rotation with the sun wheel.

According to a preferred embodiment the pick-up tube is mounted for common rotation with the planetary wheel carrier and is at least partially located in a space layer orthogonal with respect to the axis and containing said at least one planetary wheel. Such a further reduction in axial length may be obtained.

According to a further embodiment the conveying means comprise at least one conveyer disc mounted for common rotation with the planetary wheel. This conveyer disc immerges with a respective radially outer circumferential portion into the lubricant ring and is directed with a respective radially inner circumferential portion towards a lubricant droplet receiving location. Such the respective radially outer circumferential portion is wetted by the lubricant when immerging into the lubricant ring and throws droplets towards the droplet receiving location when arriving at a position adjacent the droplet receiving location during rotation of the planetary wheel. This droplet receiving location may be in connection with the locations needing lubricant.

For example the droplet receiving location may be provided with droplet impingement face means, the droplet impingement face means scattering the droplets towards engagement locations of relatively movable components of the gear unit.

The gear unit may be preassembled for combination with the auxiliary power consuming unit. This preassembled gear unit may comprise a shaft engangement member shaped for fastening engagement with a fastening portion of the auxiliary unit input shaft. Such the preassembled gear unit is maintained in the preassembled condition after combination with the auxiliary power consuming unit by engagement of the shaft engagement member with the fastening portion of the auxiliary unit input shaft. Before making this combination the preassembled gear unit may be securable in the preassembled condition by a preassembly securing member shaped substantially in accordance with the fastening portion of the auxiliary unit input shaft. This preassembly securing member is engaged with the shaft engagement meber after assembly of the tear unit for maintaining the preassembled gear unit in the preassembled status during storage and transport.

A portion of said gear change clutch may be fastened to the stator means by an encapsulation sleeve encapsulating at least part of the gear unit. This is possible because the belt pulley is provided remote from the auxiliary power consuming unit.

The encapsulation sleeve may be releasably fastenable to the stator means. In fastening the encapsulation sleeve with respect to the stator means the axial play between the first and second portions of the gear change clutch may be adjusted.

The gear unit should provide a first transmission ratio of 1:1 and a second transmission ratio of less than 1,70:1 between the gear unit output member and the gear unit input member, with the gear unit output member having the higher r.p.m. This is desirable for obtaining a smooth transition between the different modes of operation.

The gear change clutch may be controlled by a control unit in response to the r.p.m. of the gear unit input member corresponding to the r. p.m. of an internal combustion engine driving the gear unit input member such that the r. p.m. of the gear unit output member is increased with respect to the r.p.m. of the gear unit input member when the rpm of the gear unit input member is reduced below a predetermined r.p.m. value.

It is, however, not always necessary to change the transmission ratio when the predetermined r.p.m. value is reached. If the auxiliary power consuming unit is for example an electric power generator feeding an electric accumulator, the increased transmission ratio is only necessary if the accumulator is in a poor condition. It is therefore possible that the increase of the r.p.m. of the gear unit output member beyond the r.p.m. of the gear unit input member in response to decrease of the gear unit input member below the predetermined r.p.m. value is additionally responsive to a signal representing a need for r.p.m. increase of said auxiliary power consuming unit.

It is most desirable said all movable components of the gear unit are at rest with respect to the gear unit output member when the gear unit output member is directly driven from the gear unit input member through the free wheel means. In such case there exists no need for lubrication and no lubricant flow must be maintained.

The free wheel means should be at least partially immerged into the lubricant ring. The free wheel means may for example be of the clamp roller type.

If the first housing portion and the second housing portion are connected to each other, the ring wheel may be fixed axially between the first and the second housing portion.

The lubricant conveying means as defined above may have lubricant discharge means in a position opposite to at least one substantially radially directed bore of a rotating hollow component which is rotating about the axis with respect to the lubricant discharge means. This lubricant discharge means may be an inner end of a pick-up tube or a conveyer disc. The discharged lubricant must occasionally be conveyed through a radial bore of a hollow component for example through a radial bore of the sleeve-shaped gear unit input member in order to provide the roller bearings between the gear unit member and the gear unit output member with lubricant. On the other hand a lubricant flowing through such a radial bore in radially inward direction is subject to centrifugal forces. In order to make sure that a radially inward flow occurs in spite of such centrifugal forces it is proposed that the radial bore has an elongate cross-section area along the axis.

According to a further aspect this invention concerns a planetary gear driven power consuming unit, comprising stator means and an input shaft unit with an axis, for driving a driven unit within said stator means, said input shaft unit being rotatably mounted with respect to said stator means about said axis through shaft bearing means and extending axially beyond said shaft bearing means towards a free end of said input shaft unit and further comprising planetary gear means including a sun wheel, a ring wheel, a planetary wheel carrier and at least one planetary wheel on said planetary wheel carrier, and further comprising free wheel means, a gear change brake unit controllable by external control means and a lubricant chamber for receiving a liquid lubricant, an input torque transmission unit of said planetary gear means being in driving connection with said planetary wheel carrier, said ring wheel being connected for common rotation with said input shaft unit, said gear change brake unit being adapted for selectively either preventing a rotation of said sun wheel with respect to said stator means or releasing said sun wheel for rotation about said axis with respect to said stator means, said free wheel means permitting rotation of said input shaft unit with respect to said input torque transmission unit in a predetermined sense of rotation in response to said gear change brake unit preventing said sun wheel from rotation with respect to said stator means, said free wheel means transmitting an input torque from said input torque transmission unit to said input shaft unit in said predetermined sense of rotation in response to said gear change brake unit releasing said sun wheel for rotation about said axis with respect to said stator means, said sun wheel being hollow with a central passage therethrough, with a first axial end portion nearer to said shaft bearing means and with a second axial end portion nearer to said free end, said input torque transmission unit extending through said hollow sun wheel for transmitting an input torque from drive means engagement means located adjacent a second end portion side of said sun wheel to a planetary wheel carrier portion located adjacent a first end portion side of said sun wheel, said second axial end portion of said sun wheel being connected for common rotation about said axis with a sun wheel braking member, said sun wheel braking member carrying a first brake portion of said gear change brake unit, a second brake portion of said gear change brake unit being operationally fastened against rotation about said axis with respect to said stator means, a ring wheel support member connecting said ring wheel with said input shaft unit for common rotation being located on a side of said planetary wheel carrier portion axially remote from said sun wheel.

A power consuming unit of this type, namely an electric generator, is known from U.S. Pat. No. 2 327 769.

According to this U.S. patent an input shaft member driving the rotor of the power generator extends for a short length beyond the shaft bearing means outwards of a stator housing. A cooling fan is mounted for common rotation onto the input shaft member outside of the shaft bearing means. A gear housing is fastened to an end wall of the stator housing. This gear housing accommodates all components of the planetary gear driving mechanism. This gear housing provides at an end thereof remote from the stator housing secondary bearing means. In these secondary bearing means there is rotatably mounted an input torque transmission shaft which carries outside the gear housing a belt pulley non-rotatably mounted on said input torque transmission shaft. The input torque transmission shaft extends from the secondary bearing means towards the stator means of the electric power generator through a hollow sun wheel of the planetary gear means. All components of the planetary gear means and of the free wheel are mounted on the input torque transmission shaft. The input torque transmission shaft is arranged in axial alignment with the input shaft member of the electric power generator without overlapping in axial direction. The ring wheel of the planetary gear means is coupled with the input shaft of the electric power generator by a bell-shaped coupling part.

The design of this known power generator requires a large space particularly in axial direction for the gear unit. As a result thereof this known power generator is frequently not adapted for use in motor vehicles in which only little space is available for the electric power generator.

It should be noted here that planetary gear driven electric power generators of the above described type are particularly intended for use in motor vehicles because they allow to change the transmission-ratio in response to the r.p.m. of the internal combustion engine driving the motor vehicle. In motor vehicles one must expect a large variation of the r.p.m. of the internal combustion engine in response to different phases of operation of the motor vehicle. On the other hand it is most desirable to drive an electric power generator with a substantially constant r.p.m. For this reason the planetary gear driven power generators of the above described type have been developed particularly for motor vehicles. It is therefore a considerable disadvantage of the known type of power generators according to the U.S. Pat. No. 2,327,769 that it is frequently not applicable for motor vehicles because of its large space requirements.

It is an object of the present invention to provide a planetary gear driven power consuming unit and more particularly, a planetary gear driven electric power generator for application in motor vehicles which requires less space. Further objects of the present invention will be discussed below.

According to the present invention the input torque transmission unit surrounds the input shaft unit along an axial overlapping path and the input torque transmission unit is rotatably mounted on and radially supported by the input shaft unit within this axial overlapping path.

It has been found that a planetary gear driven power consuming unit can be built with considerable smaller dimensions as compared with a generator as described in the U.S. Pat. No. 2,327,769.

The input shaft unit may be based on an input shaft member rotatably mounted by the shaft bearing means in the stator means. This input shaft member can be a usual shaft as used for driving power generators. This input shaft may have at least along a larger part of its axial length a full material cross section. This input shaft member may be prolongated by a prolongation unit which is in axial alignment with the input shaft. This prolongation unit is connected for common rotation with the input shaft by connection means such that the prolongation unit is resistant to a bending torque exerted thereto about a bending axis perpendicular to the axis of the input shaft member. By using such a prolongation unit it is possible to keep the input shaft member short and particularly as short as desired for providing a simple belt pulley on the input shaft. Such one and the same basic power generator can be selectively equipped either with a simple belt pulley or with a planetary drive mechanism. A further advantage of the prolongation unit is that it may be assembled with the other components of the planetary gear unit into a preassembly such that this preassembly can be combined with the basic power consuming unit in a simple and non-expensive final assembling operation.

The prolongation unit may comprise a prolongation sleeve. In such case the connection means can comprise a tensioning member which is inserted into the prolongation sleeve. This tensioning member is brought in screw connection with the input shaft member and can axially press the prolongation sleeve against abutment face means axially fixed with respect to the input shaft member. The input torque transmission unit may in such a construction be rotatably mounted on the prolongation unit as a result of a preassembling step. The ring wheel support member may be fastened for common rotation with the input shaft unit by axially clamping the ring wheel support member between the input shaft member and the prolongation unit.

Alternatively the input shaft unit may again comprise an input shaft member rotatably mounted by the shaft bearing means. In this case the input shaft member may be longer than the normal input shaft of a power consuming unit which is normally provided with a simple belt pulley. With such a prolongated input shaft member which may again be of full material cross section along the larger part of its length input sleeve means may be used surrounding these prolongated input shaft member. These input shaft sleeve means are again fastened on the input shaft member. With such an embodiment there is a long support path for the input shaft sleeve means on the input shaft member such that the input shaft unit as a total is not sensitive to bending forces which may result from the torque transmission from a driving unit such as a motor vehicle engine to the gear unit even if the driving unit is coupled with the gear unit at a location far remote from the shaft bearing means. The input torque transmission unit may again be rotatably mounted on the input shaft sleeve means. Such one can again preassemble the gear parts to a large extent and combine in a final assembly step the preassembled unit with the basic power consuming unit by shifting the input shaft sleeve means onto the prolongated input shaft member and secure the input shaft sleeve means with respect to the input shaft member by usual torque transmitting securing means. For example, the input shaft member may be provided adjacent the free end thereof with a securing member and this securing member can be tightened such as to act onto an adjacent end of the input shaft sleeve means and to press the input shaft sleeve means against abutment face means fixed with respect to the input shaft member. The securing member may be, for example, a securing nut which is screwed onto external thread means of the input shaft member. It is of high advantage if these external thread means extend axially beyond the input shaft sleeve means so that a nut of simple design can be used which remains outside the hollow space of the input shaft sleeve means. To keep the nut outside the hollow space of the input shaft sleeve means is of considerable advantage because the total diameter of an assembly comprising the input shaft and the input shaft sleeve means can be kept small.

The input sleeve means may comprise one single input shaft sleeve member extending in axial direction substantially between the free end of the input shaft unit and the ring wheel support member. This is a very useful construction. Alternatively it is also possible that the input sleeve means comprise a first input sleeve section nearer to the shaft bearing means and a second input shaft sleeve section nearer to the free end of the input shaft unit. In this embodiment the input torque transmission unit can be rotatably mounted on the second input shaft sleeve section. It is to be noted here, as will be discussed later, that the necessity may come up to provide a preassembly comprising the input sleeve. This preassembly may be manufactured according to usual ball bearing manufacturing technics with bearing tracks being shaped on the input shaft sleeve. In such case it is very helpful in view of cost reduction to keep the components participating in the preassembling according to ball bearing assembling technics as small as possible as these components are to be made from a most expensive steel material. This is the reason why the input shaft sleeve means may be divided into a first and a second section such that only one section of these two sections is to participate in a preassembling operation according to ball bearing technics.

Again, the ring wheel support member may be fastened to the input shaft unit through or by the input shaft sleeve means. For example, the ring wheel support member may be axially clamped between the input shaft sleeve means and abutment face means fixed with respect to the input shaft member. Alternatively or additionally, the ring wheel support member may be centered on a tail section reduced in diameter of the input shaft sleeve means and may be axially clamped between a shoulder face of the tail section and an abutment face fixed with respect to the input shaft member.

As an alternative besides the clamping of the ring wheel support member it is also possible to make the ring wheel support member integral with at least an input shaft section of the input shaft sleeve means.

The principles of the invention are also applicable if the input shaft unit comprises only a simple input shaft member of the power consuming unit which may be prolongated beyond the normal length of a power consuming unit input shaft. One can in such case rotatably mount the input torque transmission unit on this input shaft member with the ring wheel support member being axially and angular fixed with respect to the input shaft member. With such an embodiment the degree of preassembling is not as high as with the previously discussed embodiments. Nevertheless a quite high degree is also possible in this latter embodiment in that the input torque transmission unit can be used as a carrier of the preassembled components. The ring wheel support member may be in the latter discussed embodiment press-fitted on the input shaft member or shrunk thereon.

The input torque transmission unit can essentially consist of an input torque transmission sleeve which extends in axial direction between the planetary wheel carrier portion and the drive means engagement means. The drive means engagement means may be provided by a drive means engagement member surrounding the input torque transmission sleeve and fastened thereon for common rotation therewith. Alter-natively the drive means engagement means may be integrally shaped on the input torque transmission sleeve. The drive means engagement means may be shaped, for example, as a belt pulley for a flat or a V-shaped belt which is frequently used for driving an electric power generator from an output shaft of a motor vehicle engine.

The input torque transmission unit may be rotatably mounted on the input shaft unit in using roller bearing means such as ball bearing means or needle bearing means. The use of needle bearing means and ball bearing means is well known in the art. Power generator and gear box manufacturers generally like to use roller bearings in the preassembled form comprising an inner ring, an outer ring and roller members therebetween, the roller members possibly being guided by a cage. Such a type of roller bearings is easily available on the market and the manufacturing costs of gear boxes and power generators can be considerably reduced by using such ball bearing products.

According to a further very important feature of the present invention at least one of the roller bearing means between the torque transmission unit and the input shaft unit and, more particularly, an input shaft sleeve are inserted such that the roller members, such as balls or needles, are in direct rolling contact with circumferentially rolling tracks shaped on at least one of the input shaft unit and the input torque transmission unit. By shaping a roller track directly in the material of a input shaft sleeve or a input torque transmitting sleeve, one accepts certain assembling problems and also certain additional costs. These problems and costs are justified in the present specific situation because one can considerably reduce the overall radial dimensions of the gear driven power consuming unit. It is of specific advantage to have the roller members in rolling contact with a track directly shaped on the input shaft sleeve and also in rolling contact with a track shaped on an input torque transmission sleeve. Inspite of avoiding usual ball bearings it was found that the combination of an input shaft sleeve and an input torque transmission sleeve with bearing rollers therebetween in direct engagement with both sleeves can be offered by bearing ball manufacturers at an acceptable price, particularly in those cases, in which the volume of the respective sleeves and the necessary machining operations to be applied thereto are kept at a minimum.

The free wheel means may be located radially between an input torque transmission sleeve of the input torque transmission unit and the input shaft unit itself. Alter-natively the free wheel means may also be provided between the planetary wheel carrier portion and the ring wheel support member. This latter alternative may have the advantage of reducing lubrication problems with respect to the free wheel means as more thoroughly discussed below.

In any case, one can again use a fully preassembled free wheel means with roller members between two concentric ring members. It is, however, also possible to provide engagement faces for clamping rollers or the like of the free wheel between respective faces of the gear unit.

The sun wheel and the sun wheel braking member may be again rotatably mounted on the input torque transmission unit by roller bearing means such as ball bearing means or needle bearing means. It is again suggested that at least part of the roller members of these latter roller bearing means should be in direct rolling engagement with a circumferential track shaped on at least one of an input torque transmission sleeve, said sun wheel and said sun wheel braking member. This results again in a reduction of an overall diameter of the gear unit.

For rotatably mounting the sun wheel and the sun wheel braking member on the input torque transmission unit one can use with high advantage a separate hub member which separate hub member may be allocated to the sun wheel or the sun wheel braking member or both of them. Such a hub member has a simple design.

This hub member may again be rotatably mounted on an input torque transmission sleeve of the input torque transmission unit by roller bearing means such as ball bearing means or needle bearing means. The roller members of these roller bearing means may again be in direct rolling engagement with respective tracks shaped on the input torque transmission sleeve and the hub member. Such one has again the advantage of a small diameter of the overall construction. Moreover, there is the possibility of providing a preassembly of an input shaft sleeve, a torque transmission sleeve and a hub member in coaxial and axially overlapping arrangement which can be produced according to ball bearing manufacturing technics in a ball bearing manufacturing plant at relative small costs, particularly in such cases in which the volume of the participating elements i.e. input shaft sleeve, input torque transmitting sleeve and hub member, are reduced in volume as far as possible and are of simple constructional design.

It is of high advantage if the sun wheel and the sun wheel braking member are manufactured separately from a common or even separate hub members. Such the manufacturing costs of the hub member can be reduced considerably because only a small hub member must be manufactured from ball bearing steel whereas the rest, namely the sun wheel and the sun wheel braking member, or both, can be manufactured of less expensive materials.

The sun wheel braking member may be shaped as a flange member following a plane substantially orthogonal to the axis. This shape has the advantage of requiring reduced axial space.

The first brake portion is normally side by side with a planetary gear means and may be axially movable with respect to the sun wheel braking member in operation. The second brake portion of the gear change brake unit is usually of considerable volume because it contains electric or hydraulic or pneumatic actuation means. It has been found that it is of high advantage to arrange this second brake portion of the gear change brake unit such that it has a common plane with the planetary gear means., this common plane being orthogonal to the axis. The axial length of the gear unit can be considerably reduced by this measure. A most preferred embodiment is that the second brake portion of the gear change brake unit is substantially within the axial extent of an assembly comprising the planetary gear means, the free wheel means, the ring wheel support member and the lubricant chamber. By such a design there is no essential additional space requirement for the second brake portion. This is of high importance in order to keep the axial length of the gear unit and of the gear driven power consuming unit as a total as low as possible. Surprisingly, the reduction of axial space is more important than the reduction of radial dimension.

The lubricant chamber may be confined by first side wall means located on the first end portion side of the sun wheel and second side wall means located on the second end portion side of the sun wheel. These first and second side wall means are axially connected by circumferential chamber wall means. In such case the second brake portion can be arranged such as to surroundingly overlap the circumferential chamber wall means in axial direction.

In order to reduce the axial dimension it is quite helpful if the first side wall means comprise the ring wheel support member. The circumferential chamber wall means can be integral with at least one of the first side wall means and the second side wall means.

The second side wall means raise sealing problems. It is therefore proposed that the second wall means is sealed with respect to a hub member of at least one of the sun wheel and the sun wheel braking member by first rotation permitting sealing means and that this hub member is sealed with respect to the input torque transmission unit by second rotation permitting sealing means. Thus the most important sealing problem is solved. First side wall means may be sealed with respect to the input shaft unit. This latter sealing problem is, however, easy to be solved because no relative rotation occurs at this location. For example, one can seal the first side wall means with respect to the input shaft sleeve means of the input shaft unit and one can further seal the input shaft sleeve means with respect to the input shaft member of the input shaft unit.

In using an input torque transmission unit shaped as a sleeve, this sleeve can be sealingly closed adjacent an end thereof remote from the input shaft bearing means. Then the end of the input shaft unit is located inside the sealingly closed end of the input torque transmission unit. Thus the last sealing problem is solved and one has a completely closed lubricant chamber. This is of high importance because the provision of a completely closed lubricant chamber does allow to fill this lubricant chamber with a volume of lubricant which is independent of external operational lubricant supply means and can be dimensioned such that it is sufficient for the life of the device. It is to be noted here that the sealing rings may be of usual construction. It is possible and preferred to use sealing rings of plastic or elastomeric materials which are resistant to rotational friction. It should not be excluded, however, to use so called labyrinth-type sealing means.

The lubricant chamber is preferably shaped as an annular chamber about the axis, such that it accommodates at least one of the planetary gear means and the free wheel means. The annular lubricant chamber can rotate about the axis and can particularly rotate about the axis together with the ring wheel. Then a liquid lubricant ring is formed at the periphery of the annular lubricant chamber in response to centrifugal forces. In such case, lubricant conveying means are needed within the lubricant chamber for conveying the lubricant from the lubricant ring towards locations situated radially inwards and requiring lubrication.

In order to avoid lubricant escape problems it is proposed that the lubricant ring should in operation be restricted to an area radially outside of rotatable sealing means.

A particular problem is to transport lubricant from the lubricant ring towards bearing means provided between an input torque transmission sleeve and the input shaft unit. The conveying means should therefore be adapted to direct a lubricant beam or lubricant droplets towards at least one substantially radial opening extending through the input torque transmission sleeve of the input torque transmission unit such that the lubricant beam or lubricant droplets can pass through said at least one opening into an interspace between the input torque transmission sleeve and the input shaft unit. In this interspace the received lubricant can further be distributed towards bearing means provided within this interspace and used for rotatably mounting the input torque transmission sleeve on the input shaft unit.

In order to increase the passage probability of lubricant through the radial opening it is preferred that this at least one radially extending opening is of elongate cross section in circumferential direction.

A further possibility of conveying lubricant towards lubrication requiring locations is to direct a lubricant beam or lubricant droplets against scattering faces.

A still further conveying method according to the present invention for conveying lubricant in axial direction is as follows: An input torque transmission sleeve of the input torque transmission unit is provided with a radially inner circumferential face which is divergent in axial direction. Lubricant allotting means are allocated to said divergent circumferential face such that lubricant is received by said divergent circumferential face. The received lubricant flows then along the divergent circumferential face in axial direction under the influence of centrifugal forces. The divergent circumferential face may be axially confined by a radially inwards directed sill so as to maintain a certain reservoir of lubricant near a location requiring lubrication. When lubricant has once been conveyed to the inside of a torque transmission sleeve one can provide at least one radially directed perforation through the torque transmission sleeve. The lubricant passing in radially outwards direction through this perforation can be used for lubricating further lubricant requiring locations, for example, bearings between a hub member and the input torque transmitting sleeve.

For transporting lubricant against the action of centrifugal forces, one can use lubricant conveying means based on a lubricant pick-up tube having a radially outer end entering into the lubricant ring. This pick-up tube is provided with pick-up means directed in substantially circumferential direction about the axis. This pick-up tube is located such that it rotates with respect to the lubricant chamber and as a result thereof also with respect to the lubricant ring. Such a Pitot pressure is built up in the pick-up tube which conveys the lubricant in radial inwards direction.

According to a preferred embodiment, which is a very important aspect of the present invention, the conveying means comprise at least one conveyer disc mounted for common rotation with at least one planetary wheel. This conveyer disc immerges with a respective radially outer circumferential portion into the lubricant ring and is directed with a respective radially inner circumferential portion towards a lubricant droplet receiving location. Thus, the radially outer circumferential portion is wetted by lubricant when immerging to the lubricant ring. When this wetted portion comes out of the lubricant ring lubricant, for example in form of droplets, is thrown against a lubricant receiving location during the movement of the planetary wheel.

For improving the transport capability of the conveyer disc it may be helpful, to provide liquid pick-up means at the periphery of the conveyer disc. These pick-up means may be provided, for example, by radial recesses or slots at the periphery of the conveyer disc. These recesses or slots receive a greater amount of lubricant during immerging than a smooth conveyer disc could do. When such a conveyer disc provided with liquid pick-up means is used, and when the lubricant liquid is to be thrown against an opening through a rotating sleeve, one must select the position of the lubricant pick-up means and the circumferential position of the opening through the sleeve such that the lubricant ejection from a lubricant pick-up means towards an opening occurs in the correct relative position such that the lubricant hits into the opening.

Assuming now that in accordance with the above discussion the lubricant ring exists within the lubricant chamber, it is helpful to have the free wheel means being at least partially immerged into the lubricant ring within the lubricant chamber such that the free wheel means are lubricated in operation. This can readily be done in calculating the radial width of the lubricant ring and in locating the free wheel means such that they immerge into the lubricant ring at least to such an extent that all parts of the free wheel means which require lubrication are wetted with lubricant. The same is true for the ring wheel. One should consider to have the radially inner teeth means of the wheel ring at least partially immerged into the lubricant ring within the lubricant chamber. It is an essential feature of the present invention that the input torque transmission unit, the planetary gear means, the free wheel means and the allocated bearing means are at rest with respect to the input shaft unit when the input shaft unit is directly driven from the input torque transmission unit through the free wheel means. As a consequence thereof there is further no relative rotation at the locations which are sealed by rotating sealing means. Due to this peculiarity of the present invention at the high input r.p.m. of the input torque transmission unit no lubrication is necessary. Therefore no harm results from the fact that in this situation no lubricant can be conveyed to the parts to be lubricated when being moved relative to each other.

The second brake portion can be supported through brake portion support means by the stator means.

If considerable heat is generated within the power consuming unit such as in an electric power generator, it may be necessary to cool the internal space of the power consuming unit. In this case it may be helpful to provide cooling air openings in an end wall of the stator means adjacent the bearing means. If now the gear unit is adjacent this end wall, it may become difficult to allow access or removal of cooling air to and from the openings. There exists, however, the possibility to provide air passages in the brake portion support means or to design the brake portion support means such that a possibility of a passage of cooling air is maintained.

The power consuming unit can, as already mentioned, be an electric power generator. Further the power consuming unit can be an auxiliary power consuming unit of a motor vehicle such as a power generator, an oil pump, a compressor or the like.

The gear change brake unit can be an electro-magnetically controlled brake unit. Preferably the gear change brake unit acts as a frictional brake unit permitting a smooth reduction of the r.p.m. of the sun wheel, possibly down to a standstill, with respect to the stator means. This is highly desirable because it avoids a shock like torque charge to the motor vehicle engine when the high r.p.m. of the input shaft unit is selected.

The second brake portion of the gear change brake unit may comprise an electro-magnetic coil unit. In this case the first portion of the gear change brake unit may be an axially movable armature. This results in a fully circular arrangement which is highly desirable in view of small space requirement.

The electro-magnetic coil unit may be of annular shape and arranged in substantially coaxial position around the planetary gear means such that a common plane contains both, the planetary gear means and the electro-magnetic coil unit. This is again of advantage in view of short axial dimension.

A most desirable overall design is as follows: The planetary gear means, the lubricant chamber, the gear change brake unit and the sun wheel braking member are of such design and of such mutual arrangement that they are enveloped by a flat virtual enveloping disc. On the other hand, the driving means engagement means may be enveloped by a virtual enveloping cylinder projecting from a side wall of the flat virtual enveloping disc remote from said shaft bearing means. The virtual enveloping cylinder may have a diameter considerably smaller than the diameter of the flat virtual enveloping disc. Such one can obtain an overall shape of the planetary gear driven power consuming unit which is very similar to the overall shape of an analogous power consuming unit in which a belt pulley is directly fastened for common rotation with an input shaft member of the rotor.

The axial width of the virtual flat enveloping disc can be reduced to a minimum, substantially corresponding to the sum of individual axial dimensions of the sun wheel, sun wheel braking member, the planetary wheel carrier portion, the ring wheel support member and the side wall of the lubricant chamber remote from the ring wheel support member. More particularly, the axial width of the virtual flat enveloping disc can be kept at less than 135% and preferably less than 130% of this sum.

On the other hand the diameter of the virtual enveloping cylinder may be kept at less than 40% and preferably less than 30% of the diameter of the virtual enveloping disc.

In other terms: The diameter of the virtual flat enveloping disc may be kept at less than 9 times, preferably less then 8.5 times the diameter of the input shaft unit, said diameter of the input shaft unit being measured axially inside the shaft bearing means.

The axial width of the virtual enveloping cylinder is dependent on the type of the input driving means. More particularly, the axial width of the cylinder can be kept at a measure corresponding to the axial width of a belt pulley.

Once more in other words: The diameter of the ritual enveloping cylinder may be less than 3 times the diameter of the input shaft unit, said diameter of the input shaft unit again measured inside the shaft bearing means.

With a type of a planetary gear means as defined above, one can easily obtain a first transmission ratio of 1:1 (direct drive) and a second transmission ratio of less than 1.70:1 between the input shaft unit and the input torque transmission unit. At a transmission ratio of 1.70:1 the input shaft unit has the higher r.p.m. when compared with the input torque transmission unit. These transmission ratios are very convenient in case of driving an auxiliary power consuming unit and, more particularly, an electric generator by a motor vehicle engine.

The gear change brake unit may be controlled by a control unit in response to the r.p.m. of the input torque transmission unit such that the r.p.m. of the input shaft unit is increased with respect to the r.p.m. of the input torque transmission unit when the r.p.m. of the input torque transmission unit is reduced below a predetermined r.p.m. value. Such one can maintain the input shaft r.p.m. of the power consuming unit rather constant inspite of the large variations of the r.p.m. of a motor vehicle engine.

The increase of the r.p.m. of the input shaft unit beyond the r.p.m. of the input torque transmission unit may be further made dependent on a signal representing a need for an r.p.m. increase of the power consuming unit. An example: An electric power generator is feeding a battery of a motor vehicle. When the r.p.m. of the vehicle engine falls below a predetermined value a change of the transmission ratio occurs only when a signal is received, saying that the battery needs more feeding currant.

Considering once more the invention in comparison with the prior art according to the U.S. Pat. No. 2,327,769, it is of utmost importance that the input shaft unit having a section extending beyond the shaft bearing means of the stator means towards the free end has no further radial support from the stator means besides said shaft bearing means. This is one of the most important reasons for obtaining a short axial length of the gear unit.

According to a further aspect the invention relates to a sub-unit of the above defined planetary gear driven power consuming unit, namely, a group of components comprising at least the input torque transmission unit, the planetary gear means, the free wheel means, the sun wheel braking member, the ring wheel support member, the lubricant chamber and the input torque transmission unit.

These components may be preassembled such as to form a preassembled gear unit with the preassembled components being in relative operational positions corresponding their relative operational positions within the completed planetary gear driven power consuming unit. In this case the ring wheel support member may be adapted for being drivingly fastened to an input shaft member rotatably mounted with respect to the stator means by the shaft bearing means.

This group of preassembled components may further comprise a prolongation unit adapted to be non-rotatably fastened to the input shaft member in prolongation alignment thereto. The prolongation unit may—within the frame of the preassembled group of components—be rotatably mounted with respect to the input torque transmission unit. Thus, this preassembled group of components may be combined with the basic power consuming unit in that the prolongation unit is fastened to the input shaft member of the basic power consuming unit in axial alignment with the input shaft member. Alternatively, the preassembled group of components may comprise input shaft sleeve means adapted to be non-rotatably fastened on the input shaft member in surrounding relationship thereto. This input shaft sleeve means may be rotatably mounted with respect to the input torque transmission unit of the preassembled components so that the terminal installation requires only to slide the input shaft sleeve means onto the input shaft member and to fasten it thereon for common rotation.

The preassembled group of components may be sucured in preassembled condition by releasable securing means. Such it is possible to introduce into an input shaft unit sleeve means of the preassembled components a bolt member having a bolt head. This bolt head is applied to one end of the input shaft sleeve unit whereas a thread at the other end of the bolt is screwed together with the nut which in the completed power consuming unit is used to fasten the preassembled unit onto the input shaft member. When the preassembled components are secured against this assembling in said way they can be shipped from a gear unit manufacturer to e.g. an electric generator manufacturer which may combine the preassembled gear unit with the basic power generator. The power generator manufacturer has only to release the bolt and the nut and then to slide the preassembled gear unit onto the input shaft member of the basic power generator. Then he has to fasten this preassembled gear unit on said input shaft member of the basic power generator by mounting and tightening the nut again.

It is even possible to prefill the preassembled gear unit before combining with the basic power consuming unit with a volume of liquid lubricant. In this case the releasable securing means such as the bolt member in connection with the nut may be selected such as to prevent escape of the liquid lubricant when the preassembled gear unit is stored or shipped.

According to a further aspect of the present invention a planetary gear driving mechanism with changeable transmission ratio comprises in coaxial arrangement about an axis, a sun wheel, a planetary wheel carrier, at least one planetary wheel, a ring wheel, free wheel means, a lubricant chamber and a gear change brake unit. This gear change brake unit is of annular shape and surrounds the ring wheel. A common plane orthogonal to the axis contains both, the ring wheel and the gear change brake unit. The gear change brake unit comprises an annular coil surrounding the ring wheel and an armature movable in axial direction with respect to the electro-magnetic coil. The advantage of the planetary gear driving mechanism as compared with a planetary gear driving mechanism as described and shown in the U.S. Pat. No. 2,327,769 is that due to the axial movement of the armature a fully circular arrangement is obtained which can be built with reduced external dimensions. Moreover, mechanical charges are transmitted in a fully symmetrical way to the gear unit with the result of reduced mechanical stress.

According to a still further aspect of the present invention a planetary gear driving mechanism with a changeable transmission ratio comprises in coaxial arrangement about an axis and mounted on a torque transmitting sleeve unit a sun wheel, a planetary wheel carrier, at least one planetary wheel, a ring wheel, free wheel means, a lubricant chamber and a gear change brake unit. This planetary gear driving mechanism can be preassembled on the torque transmitting sleeve unit without the use of a gear unit housing as shown and described in the U.S. Pat. No. 2 327 769. It is further to be noted that the planetary gear driving mechanism, preassembled on the torque transmitting sleeve unit, has a closed and compact appearance because all essential components are housed within the lubricant housing defined by the ring wheel support member and a second housing wall on the other side of the gear means when, according to the present invention, the further housing wall and the ring wheel support member are completed by external wall means to form the annular lubricant chamber. This closed and compact appearance is obtained without the use of an additional gear unit housing as used in the U.S. Pat. No. 2 327 769. The avoiding of the gear unit housing of the U.S. Pat. No. 2,327,769 is facilitated by the fact that, in accordance to the present invention, the gear unit is fully circular thanks to the use of fully circular gear change brake means with an axially movable armature. In such case the stationary gear change brake portion, i.e. the electromagnetic coil, can easily fulfill the function of a external protection against a person touching the rotating lubricant chamber housing.

According to a further aspect of the present invention a planetary gear driving mechanism with changeable transmission ratio comprises in coaxial arrangement about an axis a sunwheel, a planetary wheel carrier, at least one planetary wheel, a ring wheel, free wheel means, a lubricant chamber and a gear change brake unit. The lubricant chamber is rotatable about the axis in operation such that liquid lubricant contained within the lubricant chamber forms under the action of centrifugal forces a lubricant ring within the lubricant chamber. Lubricant conveying means are provided within the lubricant chamber for conveying lubricant in radial inwards direction from the lubricant ring towards locations requiring lubrication. In this connection it is to be considered that the U.S. Pat. No. 2,327,769 does not disclose satisfactory suggestions for lubrication and particularly not a lubrication system with a life time lubricant filling within a lubricant chamber. In particular, the U.S. Pat. No. 2,327,769 does not solve the problem, how to lubricate radially inwards located parts of a gear unit from a radially outwards lubricant ring created by centrifugal forces.

A further important aspect of the present invention is the lubricant conveying system based an a conveyer disc. This conveyer disc is mounted on a planetary wheel for common rotation with the planetary wheel. The conveyer disc immerges with a respective radially outer portion thereof into the lubricant ring and throws lubricant radially inwards from the lubricant ring.

In such a construction the driving mechanism may further comprise in a central portion a torque transmitting sleeve unit as discussed above. This torque transmitting sleeve unit may be provided with bearing means within a central passage thereof for rotatably mounting the torque transmitting sleeve unit onto a shaft unit surrounded by this torque transmitting sleeve unit. In such a situation the lubricating problem is still more complicated, it can be solved, however, in that the sleeve unit comprises at least one radial opening therethrough for admitting a lubricant stream or a droplet stream from the lubricant ring.

The principle of the conveyer disc can be still improved in that the conveyer disc is provided with lubricant pick-up means adjacent the periphery of the conveyer disc. Thus, the conveying capacity of the conveyer disc can be considerably increased. In using such a conveyer disc with lubricant pick-up means, for example, lubricant pick-up slots at the periphery of the conveyer disc, which are located in predetermined positions along said periphery a further problem may occur: If the conveyer disc is to throw lubricant towards a radial opening through a torque transmitting sleeve unit, one must consider the planetary movement of the conveyer disc with respect to the torque transmitting sleeve unit in order to make sure that the lubricant thrown radially inwards by the discrete lubricant pick-up means hits the radial hole. It is, however, relatively easy to calculate the flow path of the lubricant from the lubricant pick-up means of the conveyer disc in radially inwards direction and to select the location of the lubricant pick-up means along the periphery of the conveyer disc and the location of the radial opening along the circumference of the input torque transmitting sleeve unit such that at any time a strong lubricant stream hits the opening.

According to a further aspect the present invention relates to a bearing assembly in a planetary gear driving mechanism with changeable transmission ratio. Said planetary gear driving mechanism comprises a sunwheel, a planetary wheel carrier, at least one planetary wheel, a ring wheel, free wheel means and a gear change brake unit. The bearing assembly comprises a shaft unit, a torque transmitting bearing sleeve surrounding the shaft unit and rotatably mounted thereon by roller bearing means and a torque transmitting hub member surrounding the torque transmitting bearing sleeve and rotatably mounted thereon by further roller bearing means. At least one of the roller bearing means and the further roller bearing means comprises roller track means shaped on respective ones of the shaft unit, the torque transmitting bearing sleeve and the torque transmitting hub member. This bearing assembly which can easily be made and preassembled has the high advantage of reducing the overall diameter of the completed planetary gear driving mechanism.

According to a most preferred embodiment the shaft unit comprises a further bearing sleeve adapted for being non-rotatably mounted on the shaft member. In this case the torque transmitting bearing sleeve can be rotatably mounted by roller means on the further bearing sleeve. In this case at least one of the bearing means and the further bearing means may comprise ball-shaped roller members engaging concave bearing track means in respective ones of the shaft unit, the torque transmitting bearing sleeve and the torque transmitting hub member such as to inseparably fix at least two of the shaft unit, the torque transmitting bearing sleeve and the torque transmitting hub member with respect to each other in axial direction.

According to a further aspect this invention relates to a method of assembling a planetary gear driven power-consuming unit as defined above. According to the method of this invention at least the sun wheel, the planetary wheel carrier, the planetary wheel, the ring wheel, the free wheel means and the lubricant chamber are preassembled on the input torque transmission unit and hereupon rotatably mounted on the basic power consuming unit. This final mounting may be performed such that the torque transmission unit is slided on the input shaft member of the input shaft unit and fastened thereto.

With the described method of assembling the preassembling may further comprise rotatably mounting the input torque transmission unit on an input shaft sleeve unit. This input shaft sleeve unit may then be—subsequent to the preassembling step—non-rotatably mounted on the input shaft member.

As mentioned before, the planetary gear driven power consuming unit may be an electric power generator such as used in the electric power system of a motor vehicle. In such an electric power generator a considerable amount of energy is converted into heat. Therefore it may be necessary to cool the electric power generator by a fan, as it is already known from the U.S. Pat. No. 2,327,769. In FIG. 1 of this U.S. patent one can see that the fan is located outside the stator housing such that the fan is located between the shaft bearing means and the gear unit.

According to a further aspect of this invention the cooling fan is mounted on the input shaft unit for common rotation therewith on a side of the shaft bearing means remote from the end of the input shaft unit. This design has the great advantage of shortening the distance between the drive means engagement means and the shaft bearing means. So the gear unit becomes less sensitive to bending torques resulting, for example, by belt tension, if a belt pulley is mounted at the free end of the input torque transmission unit. Such the positioning of the fan on the rotor side of the input shaft bearing means helps to avoid the gear unit housing and thus contributes again to reduction of the axial length of the planetary driven electric power generator.

According to a preferred embodiment an electric power generator of this invention the stator means comprise a stator housing. The stator housing has an end wall axially adjacent the input shaft bearing means. The end wall is provided with cooling air passage means radially adjacent the shaft bearing means. The second brake portion is fastened to the stator housing adjacent the end wall by second braking portion fastening means. The second brake portion fastening means provide a further cooling air passage means. The cooling fan is provided within the stator housing and is adapted to provide a cooling air stream through the cooling air passage means of the end wall and through the further cooling air passage means provided by the second brake portion fastening means. Such the invention provides also a full solution of the problem of cooling inspite of the fact that the gear unit is very close to the end wall and to the fan adjacent thereto.

The various features of novelty which characterize the invention are pointed out with particularity in the claims annexed hereto and forming a part of the disclosure. For a better understanding of the invention, its operating advantages and specific objects attained by its use reference should be had to the accompanying drawings and descriptive matter in which there are illustrated and described preferred embodiments of the invention.

BRIEF DESCRIPTION OF THE DRAWINGS

The invention will be explained in greater detail hereafter with reference to embodiments shown in the accompanying drawings in which.

DETAILED DESCRIPTION OF PREFERRED EMBODIMENTS

Figure 1:
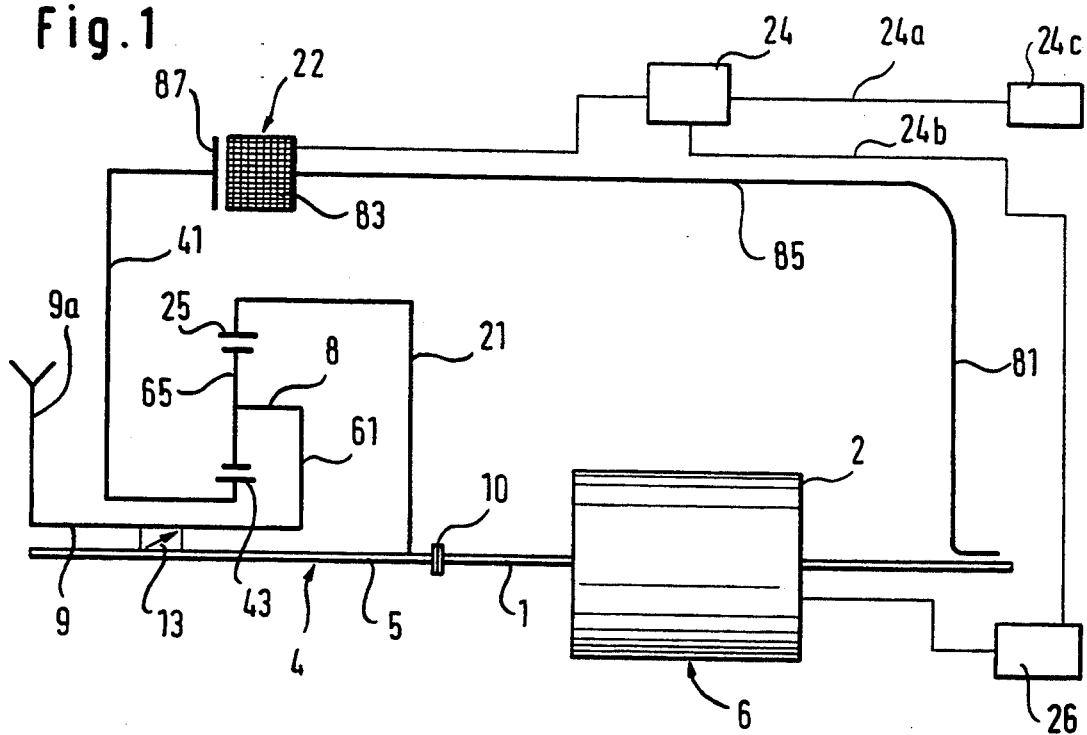
FIG. 1 shows a schematic view of a gear unit according to this invention.

In FIG. 1, an electric power generator 6 comprises a stator housing 81 in which a rotor 2 is rotatably mounted. The rotor is fastened on an input shaft 1 of the generator 6. A gear unit 4 is combined with the generator 6. The gear unit 4 comprises a gear unit input member 9 on which a belt pulley 9a is mounted for common rotation. The input member 9 is connected for common rotation with a planet carrier 61. The planet carrier 61 carries a bolt 8 on which a planet wheel 65 is rotatably mounted. The planet wheel 65 is meshing with a ring wheel 25 and a sun wheel 43. The ring wheel 25 is connected for common rotation with a gear unit output member 5. The gear unit output member 5 is connected with the input shaft 1 of the generator by coupling means 10. A free wheel unit 13 is provided between the gear unit input member 9 and the gear unit output member 5. The sun wheel 43 is connected with a sun wheel stop member 41. The sun wheel stop member 41 carries a first portion 87 of an electromagnetic gear change clutch 22. A second portion 83 of the electro-magnetic clutch 22 is fastened through an encapsulating sleeve 85 to the stator housing 81. The clutch portion 83 comprises an electro-magnetic coil which is fed by electric current from an external control unit 24. The clutch portion 87 comprises an armature which can be brought in frictional engagement with the clutch portion 83 by energizing the electro-magnetic coil. The control unit 24 has a first input 24a and a second input 24b. The belt pulley 9a is connected by a belt (not shown) with an output shaft of an internal combustion engine.

At a low r.p.m. of the internal combustion engine, the control unit 24 receives through input 24a a signal from a sensor 24c indicating that the r.p.m. of the internal combustion engine and as a result thereof also the r.p.m. of the input member 9 is below a predetermined value. In response to this signal the clutch 83 is closed such that the sun wheel 43 is stationary with respect to the stator housing 81. Under these circumstances, the output member 5 is driven with an increased r.p.m. as compared with the r.p.m. of the input member 9. A relative rotation between the input member 9 and the output member 5 is permitted by the free wheel 13. Such, the input shaft of the generator 6 is driven with a relatively high r.p.m. in spite of the low r.p.m. of the internal combustion engine. This may be particularly necessary, when an accumulator 26 fed by the generator 6 is in a poor condition. If the accumulator 26 is in good condition, it may not be necessary to increase the r.p.m. of the generator through the gear unit. Therefore, the input line 24b of the control unit 24 is connected with the accumulator 26 for detecting the condition of the accumulator. Only when both inputs 24a and 24b of the control unit 24 provide a signal to the control unit 24, the clutch 22 is energized and the sun wheel 43 is prevented from rotation.

As soon as the r.p.m. of the internal combustion engine is increased above the predetermined r.p.m. value a deenergizing signal is fed from the r.p.m. sensor 24c to the control unit 24. As a result thereof the clutch 22 is deenergized. Thus, the sun wheel 43 becomes freely rotatable. Under this condition, the free wheel 13 becomes effective and transmits the rotation of the input member 9 directly to the output member 5 and to the input shaft 1 of the generator. Thus, the r.p.m. of the generator are maintained low in spite of the increasing r.p.m. of the internal combustion engine.

In FIG. 2, one can see again the stator housing 81 of the generator and the input shaft 1 thereof. The input shaft 1 is rotatably mounted in a roller bearing 28 provided adjacent an end wall 30 of the stator housing. The inner ring member 28a of this ball bearing is shrunk on the input shaft 1. The left-hand end of the input shaft 1 is provided with external thread means 32. The sleeve-shaped output member 5 surrounds the input shaft 1 and abuts the ring wheel support member 21. The ring wheel support member 21 abuts a spacer ring 34 which abuts the inner ring member 28a which is fastened on the input shaft 1. A tensioning member 3 with a spanner face 3a engages by a terminal flange 36 the left-hand end of the output member 5. This tensioning member 3 is provided with internal thread means 36 and screwed onto the external thread means 32 of the input shaft 1. Such, the output member 5, the ring wheel support member 21 and the spacer ring 34 are axially clamped between the terminal flange 3b and the ring member 24a. Such, the output member 5 is connected for common rotation with the input shaft 1, and the ring wheel support member is connected for common rotation with the output member 5 and the input shaft 1.

The sleeve shaped input member 9 is rotatably mounted on the output member 5 by a ball bearing 11 and a needle bearing 15. The balls of the ball bearing 11 are in direct rolling engagement with roller tracks 11t and 11s shaped on the output member 5 and the input member 9. The same is true for the needles of the needle bearing 15 which are in contact with roller tracks 15t and 15s shaped on the output member 5 and the input member 9. The left-hand end of the input member 9 is closed by a cover member 17. The left-hand end portion of the input member 9 is shaped as a belt pulley.

The planet carrier 61 is fixed for common rotation on the input member 9 by teeth means 67. The planet carrier 61 carries the planet wheels 65 through the bolts which are stabilized by a further portion 63 of the planet carrier 61. The ring wheel 25 is fastened for common rotation with the ring wheel support member 21 in that a housing portion 23 is curled at 23a around a flange 21a of the ring wheel support member 21. The ring wheel support member 21 is shaped as a further housing portion such that the ring wheel carrier 21 and the housing portion 23 form an annular chamber housing 40. The sun wheel 43 is flyingly carried by the planet wheels 65 around the input member 9. The sun wheel 43 is angularly fixed with respect to the sun wheel stop member 41 through teeth means 45. The sun wheel stop member 41 is rotatably mounted on the input member 9 through a ball bearing 47 the balls of which are in direct rolling engagement with ball tracks 47t shaped on the input member 9 and 47s shaped on the sun wheel stop member 41. The sun wheel stop member 41 is provided with a radially outwards extending flange 41a. This flange 41a carries through axially deflectable spring means 49 the clutch portion 87 provided with the armature and engageable with a friction face 89 of the clutch portion 83 comprising the electro-magnetic coil. The free wheel 13 is located radially between the output member 5 and the input member 9. The clutch portion 83 is fixed to an encapsulating sleeve 85 which is fastened to the stator housing 81 and axially adjustable with respect thereto for adjusting the gap between the clutch portions 87 and 83. Within the chamber housing 40 there is defined an annular lubricant chamber 42. This annular lubricant chamber is sealed by a sealing ring 29 between the housing portion 23 and the sun wheel stop member 41 and further by a rotatable sealing ring 31 provided between the sun wheel stop member 41 and the input member 9. Moreover, this chamber is sealed by a sealing ring 27 between the housing portions 21 and 23. Further, the lubricant chamber 42 is sealed by tight engagement of the housing portion 21 (ring wheel support member 21) with the output member 5 and by the cover 17 including a sealing ring 17a.

A volume of liquid lubricant 35 is contained within the lubricant chamber 42. The liquid lubricant forms a lubricant ring 35 in operation as a result of centrifugal forces. This lubricant ring rotates together with the chamber housing 40, i. e. with the output member 5. The sealing means 29 and 31 are radially inwards of the lubricant ring 35 so that they are not charged by the pressure of the lubricant resulting from centrifugal forces. A lubricant pick-up tube 19 is fixed to the sun wheel stop member 41 and has a radially outer end with an opening 18 directed in circumferential direction about the axis A. When the sun wheel stop member 41 is prevented from rotation by energization of the clutch 22, the lubricant ring 35 rotates with respect to the non-rotating pick-up tube 19 such that a pitot pressure is built up within the pick-up tube 19. The pressurized lubricant flows through the pick-up tube 19 in radially inwards direction and through a radial bore 44 of the sun wheel stop member 41 towards the ball bearing 47. Further, the pressurized lubricant impinges on the input member 9. The input member 9 is provided with radial bores 16. Accordingly, a beam of lubricant is periodically sent through the radial bore 16 into the radial gap between the input member 9 and the output member 5. The lubricant within this radial gap can flow towards the ball bearing 11, the needle bearing 15 and the free wheel 13. The lubricant collected in the area of the needle bearing 15 is prevented from back flow under centrifugal forces by a sill 37. The lubricant arriving at the free wheel 13 is prevented from the back flow under centrifugal forces by a disc 14 and a sill 39. Such, sufficient lubrication of all bearing means and of the free wheel is warranted. Moreover, the radially inner teeth of the ring wheel 25 are immerged into the lubricant ring 35 so that the engagement faces of the planet wheels 65 and the ring wheel 25 are also provided with lubricant.

The bores 16 have an elongated cross-sectional area in circumferential direction. By this configuration, the back flow of lubricant resulting from centrifugal forces through the bore 16 is reduced such that in balance a radially inward directed flow of lubricant occurs through in the bore 16.

If the clutch 22 is released, the output member 5 and the input member 9 rotate as a unit. In this situation, no relative movement occurs between the ring wheel 25 and the sun wheel 43, no relative movement takes place between sun wheel stop member 41 and the input member 9 and no relative movement takes place between the input member 9 and the output member 5. No pitot pressure is built up in the pick-up tube 19. This is, however, not necessary, because no lubrication is required.

Figure 2:
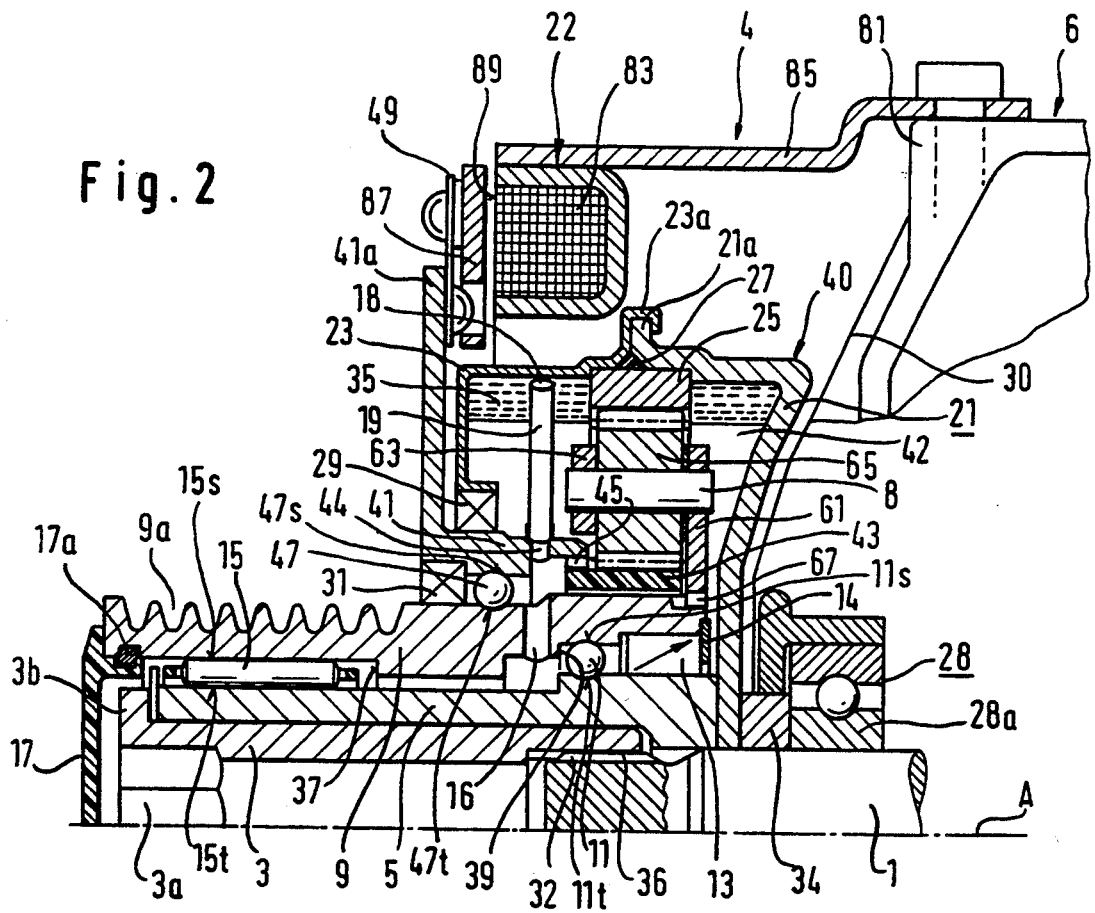
FIG. 2 shows a longitudinal section containing the axis of a gear unit according to this invention.

Before combining the gear unit 4 with the generator 6 the preassembled gear unit 4 is maintained in the preassembled status as shown in FIG. 2 by a securing bolt entered into the output member 5 from the right side in FIG. 2 and threaded into the internal thread means 36 of the tension member 3. This securing bolt has a head portion engaging the ring wheel support member 21 and pressing it against the output member 5.

It is to be noted that the clutch 22 and the planetary gear are very near to each other in axial direction. It is further to be noted that the ball bearing 11 and the free wheel 13 are substantially in the same plane as the planetary gear. The direct engagement of the ball and needle bearings with the adjacent parts further reduces the axial and radial dimensions. The gear unit is combinable with a generator of classic design in which the input shaft 1 has been provided with a simple belt pulley. Thanks to the above discussed design, the axial length of the combined generator and gear unit is not substantially longer than a corresponding classic generator with the belt pulley directly mounted on the input shaft 1.

The sealing rings 31 and 29 may be shaped as so-called sealing lips.

In operation with a high r.p.m. at a 1:1 transmission ratio, the lubricant is substantially contained within the annular chamber 42 so that escape of liquid is prevented.

Figure 3:
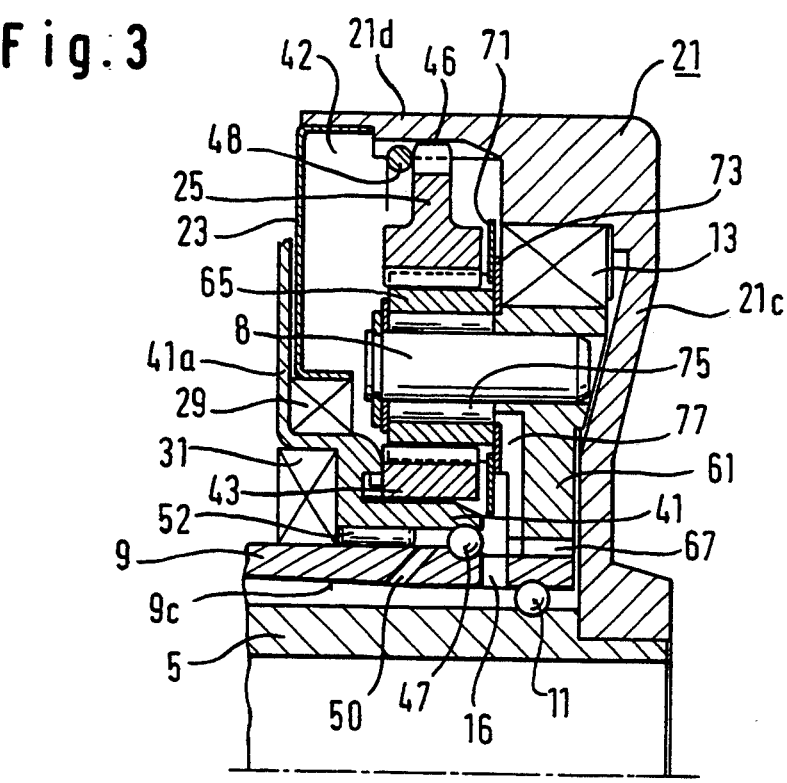
FIG. 3 shows a partial section according to FIG. 2 with a modified embodiment.

In the embodiment of FIG. 3, the ring wheel support member 21 is connected with the ring wheel 25 by teeth means 46 and axially secured by a securing ring 48. The free wheel 13 is located inside the lubricant chamber 42 such that the free wheel 13 at least partially immerges into the lubricant ring not shown. In this embodiment, the ring wheel support member 21 is shaped such as to follow the convex form of the end wall 30 of the generator as shown in FIG. 2. The free wheel 13 can, therefore, be located in a transition zone between a flange portion 21c and a ring wheel carrier portion 21d of the ring wheel support member 21, and no valuable axial space is consumed for the location of the free wheel 13. The planet wheel 65 is combined with a conveyer disc 71. This conveyer disc 71 is rotating with the planet wheel 65 and is mounted by inner teeth on the outer teeth of the planet wheel 65. The radially outer circumferential portion of the conveyer disc 71 immerges into the lubricant ring (not shown), so that the conveyer disc 71 is wetted with lubricant. This lubricant is thrown away from the conveyer disc 71 by centrifugal forces. Droplets are thrown through the circumferentially elongated radial bore 16. These droplets are scattered at the external circumferential face of the output member 5 and are directed towards the ball bearing 11 and the needle bearing 15 (shown only in FIG. 2). The conical face 9c of the input member 9 takes care of building up lubricant volume in the region of the needle bearing 15. If a certain volume of lubricant is collected adjacent the conical face 9c, lubricant can flow through a substantially radial bore 50 radially outwards towards the ball bearing 47 and towards a needle bearing 52 additionally provided between the input member 9 and the sun wheel stop member 41. It is further to be noted that the sun wheel 43 is in this embodiment radially and circumferentially fastened to the sun wheel stop member 41.

Back flow of lubricant can occur through a radial groove 77 provided within the planet carrier 61 and covered by a cover plate 73 fixed to the planet carrier 61. This back flow of lubricant lubricates a needle bearing 75 by which needle bearing 75 the planet wheel 65 is mounted on the bolt 8. The high velocity of planet wheels 65 provides a reliable lubrication of all bearings. One can again see that the ball bearings 11 and 47 are axially close together such that minimum axial dimension is obtained. The immerging of the free wheel 13 into the lubricant ring is helpful for avoiding noises and provides an effective lubrication of the free wheel.

Figure 4:
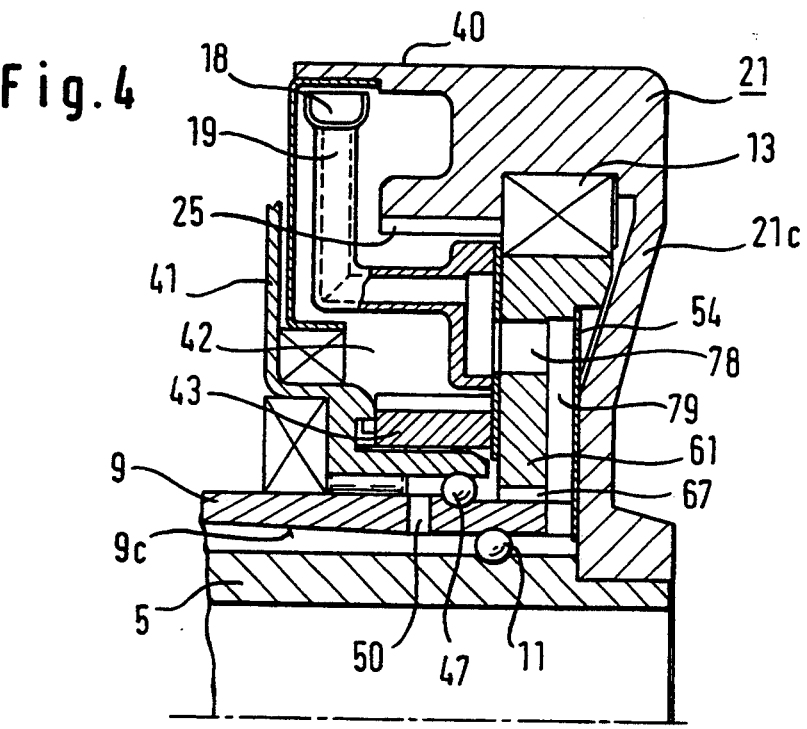
FIG. 4 shows a partial section according to FIG. 2 with a further modified embodiment and FIGS. 5 to 8 show further modified embodiments.

In the embodiment of FIG. 4, there is again used a pick-up tube 19 with a pick-up scoop 18 directed in substantially circumferential direction so as to pick-up lubricant by a pitot effect. The pick-up tube is in contradiction to the embodiment of FIG. 2 fixed to the planet carrier 61 between subsequent planet wheels. Such, at least a part of the pick-up tube 19 can be housed in the same plane as the planet wheels. The lubricant flows through the pick-up tube 19 radially inwards and through the bore 78 of the planet carrier 61 into a radial groove 79 which is covered by a disc 54 rotating with the planet carrier 61. The lubricant flowing radially inwards through the groove 79 arrives at the ball bearing 11 and flows also along the conical face 9c to the needle bearing (shown only in FIG. 2). If a predetermined amount of lubricant has been collected in the zone of the needle bearing, a back flow occurs through the radial bore 50. Thus the ball bearing 47 is also lubricated. The back-flowing lubricant further wets the sun wheel 43 and the radially inner portions of the planetary wheels. The roller bearings 47 and 52 are located substantially in the same plane as the planetary gear means 25,43,61,65. The gear change clutch 22 (not shown) is preferably also located in this common plane radially outwards of the ring wheel carrier portion 21d.

The clutch 22 is preferably annular about the axis A. This clutch can be replaced by mechanic, pneumatic or hydraulic clutches. The gear unit can be filled with oil before being combined with the generator. The encapsulating sleeve 85 and the clutch portion 83 are separate from the remaining part of the gear unit and can be supplied together with the remaining part.

The term gear unit output member 5 is to be understood in a broad sense of a member rotating with an output r.p.m. As the free wheel 13 may be according to FIG. 3 engaged with the ring wheel support member 21, the gear unit output member 5 is not necessarily directly included in the torque transmission between the ring wheel support member 21 and the input shaft 1.

The term sealing ring 31,29 is to be understood also in a broad sense and comprises all kinds of sealing means permitting relative rotation of the respective parts which are to be sealed with respect to each other.

The assembling of the gear unit and the power generator as illustrated in FIG. 2 can be performed as follows:

The power generator 6 with the input shaft 1 and the ball bearing 28,28a is completed with the bearing ring 28a being axially fixed on the shaft 1.

The unit consisting of the gear unit output member 5, the gear unit input member 9 and the sun wheel stop member 41 with the bearings 11, 15 and 47 can be manufactured in a bearing manufacturing plant. The free wheel 13 can be inserted either in the bearing manufacturing plant or in the assembling plant. In case of a clamping roller free wheel, the clamping roller engagement faces on the input member 9 and on the output member 5 may be shaped or machined in the bearing manufacturing plant.

The ring wheel support member 21 is combined with the ring wheel 25, the planet carrier 61,63 including the planet wheels 65 and with the sun wheel 43 engaged into the planet wheels 65.

The housing portion 23 including the sealing ring 29 is combined with the sun wheel stop member 41 of the preassembled unit 5,9,41.

The pick-up tube 19 is hereupon inserted into the sun wheel stop member 41.

Hereupon, the unit 21,25,61,63,65,13 is combined with the unit 5, 9,41,19,29 by axially approaching these units such that sun wheel stop member 41 engages the sun wheel 43 at 45.

Hereupon, the housing portion 23 is curled around the flange 21a, and the sealing ring 31 is inserted.

Such a complete gear unit has been obtained ready for combination with the power generator. For securing this gear unit against disassembly, the tensioning member 3 may be inserted into the output member 5. A bolt having an external thread corresponding to the external thread means 32 of the input shaft 1 may be inserted through the spacer ring 34 and the ring wheel support member 21 and screwed into the internal thread means of the tensioning member 3 with a bolt head (not shown) engaging the spacer ring 34. The lubricant chamber 42 may be filled before completion of the gear unit with the predetermined volume of liquid lubricant, e. g. through the gap between the input member 9 and the sun wheel stop member 41 before installing the sealing ring 31. The outflow of liquid lubricant may be prevented by inserting the cover member 17 and by tight engagement of the bolt member with the output member 5 and the ring wheel support member 21. The bolt member may sealingly engage with the head portion thereof the spacer ring 34.

In this preassembled status of the completed gear unit, this may be shipped to the manufacturer of the power generator or to a motor-vehicle manufacturer for being combined with the power generator 6. The power generator 6 is first of all combined with the clutch portion 83 through the casing 85. Hereupon, the preassembled gear unit as described above is combined with the power generator. For doing this, first of all the bolt member engaged into the tensioning member 3 is removed. Now, the preassembled gear unit is slided upon the input shaft 1, and the tensioning member 3 is screwed onto the external gear means 32 of the input shaft 1 by a spanner tool engaging into the spanner faces 3a of the tensioning member 3. Now, the cover member 17 may be engaged again into the input member 9.

The escape of lubricant oil may be avoided in metering the lubricant oil such that it remains below the level of the input member 9, when the gear unit is maintained in a position with horizontal axis without rotation.

In the preceding description, the unit 22 has been nominated "an electromagnetic clutch" and the portions thereof have been nominated clutch portions 83 and 87. These terms are basically correct, because the unit 22 has the function of preventing or releasing a relative rotation between the sun wheel 43 and the casing 85.

In technical practice, it is, however, more usual to designate the unit 22 as a brake unit with brake portions 83 and 87. Correspondingly, one can understand the sun wheel stop member 41 as a braking member.

Figure 5:
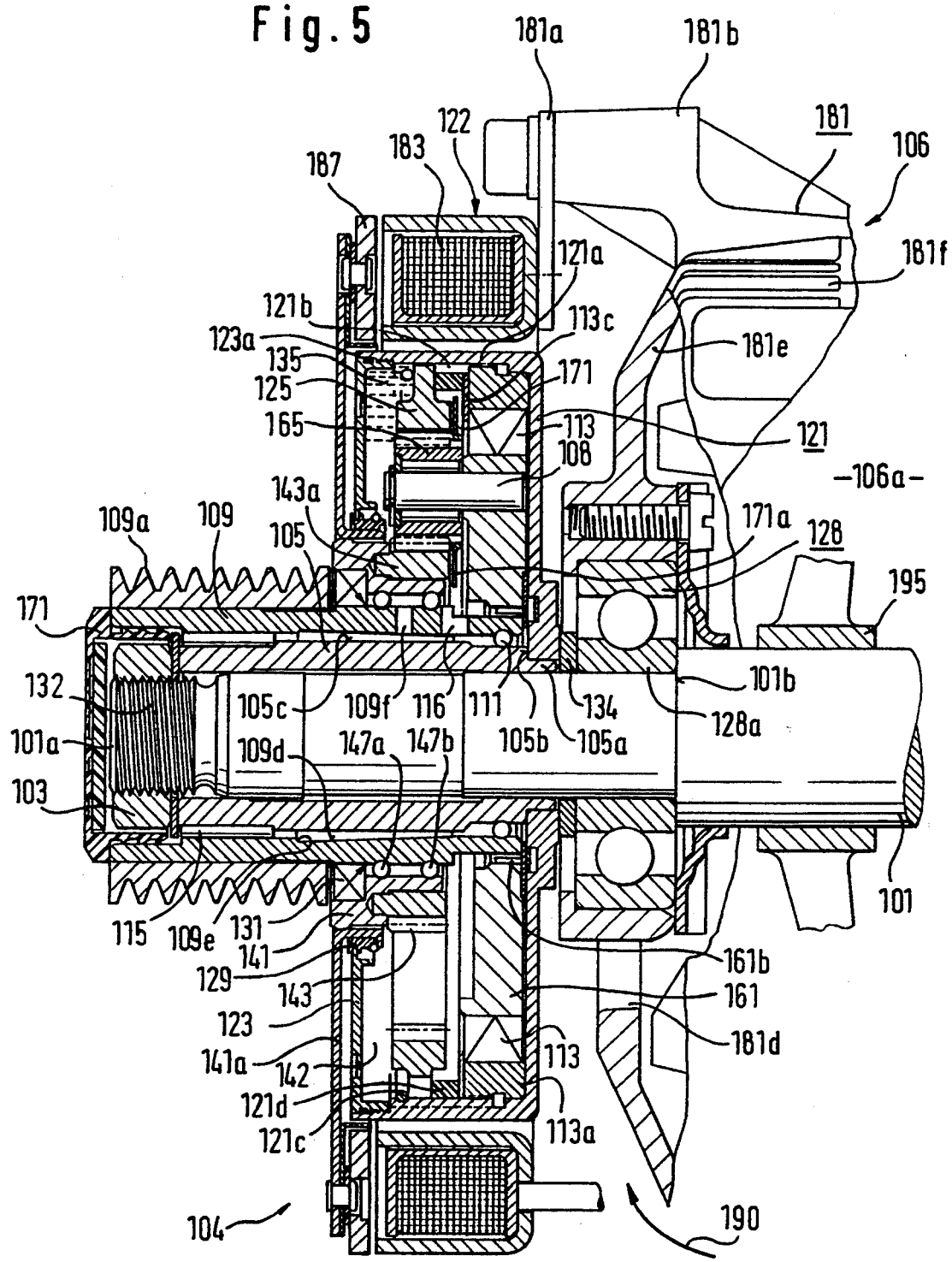

In FIG. 5, there is shown a further embodiment with analogous parts designated by the same reference numerals as in FIGS. 2 and 3, said reference numerals being increased by 100.

The embodiment of FIG. 5 is very similar to the embodiments of FIGS. 2 and 3. There exist, however, the following important differences:

The input shaft member 101 is prolongated beyond the ball bearing 128,128a, such as to extend beyond the left-hand end of the sleeve member 105, this sleeve member 105 being designated here as an input shaft sleeve member 105. The input shaft sleeve member 105 is provided at its right-hand end with a tail portion 105a of reduced diameter and with a shoulder face 105b. The ring wheel support member 121 mates on the tail portion 105a and engages the shoulder face 105b. The left-hand end portion 101a of the input shaft member 101 extending beyond the left-hand end of the input shaft sleeve member 105 is provided with external thread means 132. A nut 103 is threaded onto the external thread means 103 and engages the left-hand end of the input shaft sleeve member 105 such as to urge the shoulder face 105b against the ring wheel support member 121 and to urge the ring wheel support member 121 through the spacer ring 134 against the internal bearing ring 128a of the ball bearing 128,128a. It is to be noted that the internal bearing ring 128a is axially fixed by engagement with a shoulder face 101b of the input shaft member 101 and that the tail portion 105a has an axial length smaller than the axial width of the ring wheel support member 121 at the radially inner circumference thereof such that the ring wheel support member 121 is pressed against the internal bearing ring 128a, and the ring wheel support member 121 is fastened for common rotation with the input shaft member 101. The designation of the input shaft sleeve member 105 is due to the fact that it is fastened for common rotation with the input shaft member 101. Therefore, the combination of the input shaft member 101 and the input shaft sleeve member 105 may be understood as an input shaft unit 101,105.

An input torque transmission sleeve member 109 is rotatably mounted on the input shaft sleeve member 105 by a needle bearing 115 and a ball bearing 111. The balls of the ball bearing 111 engage respective concave tracks of both the input shaft sleeve member 105 and the input torque transmission sleeve member 109. A belt pulley 109a is shrunk or press fitted onto the input torque transmission sleeve member 109. A hub member 141 is rotatably mounted on the input torque transmission sleeve member 109 by ball bearings 147a and 147b. The ball bearings 147a,147b engage into concave tracks of both the input torque transmission sleeve member 109 and the hub member 141.

A subunit is established consisting of the components 105, 109,141 and the roller bearings 111,115,147a,147b. This subunit can be manufactured easily by a roller bearing manufacturer. It is to be noted that the roller bearings 115, 111,147a, 147b are made without the usual bearing rings, because the tracks for the roller members are directly shaped in the material of the components 105,109 and 141. This is of high advantage, because by avoiding usual roller bearings the radial dimension of the subunit 105,109,141 can be considerably reduced. Nevertheless, by concentrating the bearing means in locations between the input shaft sleeve member 105 and the hub member 141 with the input torque transmission sleeve member 109 therebetween it is possible to have this unit at a relatively low price from a special manufacturing plant.

It is further to be noted that the input shaft sleeve member 105 is radially supported on a large supporting length by the input shaft member 101 so that one can provide the belt pulley 109a on the side of the gear unit remote from the power generator 106, where it is easily accessible for the belt or other driving means.

The sun wheel 143 is made as a separate part separate from the hub member 141, which is again of high advantage in view of keeping the manufacturing expenses low. This is again true for the sun wheel braking member 141a, which is separate from the hub member 141. The braking member 141a can be made of a less expensive material than the hub member 141 and can be shaped according to shaping methods which are not readily available for the material to be used for the hub member 141, because of the ball races to be shaped thereon.

The ring wheel support member 121 is shaped integrally with a radially outer circumferential wall 121a and the ring wheel 125 is rotatably fixed thereon by a spline means 121b and secured in axial direction by a spring clip 121c. The housing portion 123 is secured to the circumferential wall 121a by thread means or by press fit or the like with a sealing ring 123a. The braking member 141a is sealingly press-fitted on the hub member 141. The sun wheel 143 is fixed on the hub member 141 by mounting pins 143a.

The outer ring portion 113a of the free wheel 113 is fastened within the ring wheel support member 121 by a spacer member 121d interposed between the ring wheel 125 and the outer ring portion 113a. The clamping rollers of the free wheel 113 are axially secured by a securing disc 113c axially secured by the spacer ring 121d.

The stator housing 181 of the power generator 106 carries the second brake portion 183 by rigid, radial strap means 181a. These strap means 181a are distributed around the periphery of the stator housing 181 and are carried by integrally cast projections 181b of the stator housing 181, which are also distributed around the periphery of the stator housing. Such, air passages 190 are defined. These air passages 190 are in air flow communication with further air passages 181d of the stator housing 181 adjacent the ball bearing 128,128a. Such, a cooling air stream is possible towards or from the cavity 106a of the power generator 106 in spite of the close location of the gear unit 104 with respect to the front wall 181e of the stator housing 181. Further air passages 181f are provided in the stator housing for permitting an uninterrupted air flow from atmosphere to the cavity 106a and back to atmosphere. A fan may be mounted on the input shaft member 101 within the cavity 106a.

The assembling may be made as follows:

The power generator 106 is available with the input shaft member 101 rotatably mounted in the ball bearing 128,128a. The bearing assembly 109,105,141 is provided by a ball bearing manufacturer. The ring wheel support member 121 is combined with the planet wheel carrier 161 including the planet wheels 165 and with the free wheel 113 including the ring member 113a thereof and further with the ring wheel 125 with the spacer member 121d and the securing disc 113c. This subassembly is secured by the spring clip 121c and is closed by the housing portion 123.

The premounted bearing assembly 109,105,141 is combined with the sun wheel braking member 141a and the sun wheel 143 by inserting the mounting pins 143a into bores of the hub member 141. Further, the sealing ring 131 and the belt pulley 109a are mounted onto the sleeve member 109. Hereupon, the premounted unit 121,113,161,165,125,123 is combined with the premounted bearing assembly 109,105,141 by axially approaching these premounted units such that the sun wheel 143 engages the planet wheels 165, the sleeve member 109 engages the planet wheel carrier 161 for common rotation at 161b, and the ring wheel support member 121 is seated on the tail portion 105a of the sleeve member 105. Hereupon, the sleeve member 105 can be slided onto the input shaft member 101 and secured by the nut 103. Then, the cover member 117 may be fixed to the sleeve member 109.

Alternatively, the preassembled gear unit 104 mounted on the sleeve member 105 can be secured for shipping purposes by a bolt member having substantially the form of the input shaft member 101 and a bolt head acting onto the spacer ring 134. This bolt member is secured by the nut 103. The gear unit may then at a later date be mounted on the input shaft member 101 after removing the nut 103 and the bolt member. Finally, the nut 103 is screwed again onto the input shaft member 101, and the cover member 117 is attached. The lubricant may be filled into the lubricant chamber 142 before or after assembling the gear unit 104 with the power generator 106.

The lubrication system corresponds to the lubrication system of FIG. 3. The oil droplets arriving from the throwing disc 171 through the hole 116 on the circumferential face 105c are scattered against a circumferential face 109d and collected thereon. The circumferential face 109d is divergent so that collected lubricant droplets flow to the left under centrifugal forces. A sill 109e provides a certain volume of lubricant for warranting continuous lubrication of the bearing needles 115. Further, a lubricant is scattered towards the bearing balls 111. Further, lubricant can flow from the divergent circumferential face 109d through a bore 109f radially outwards towards the bearing balls 147a,147b.

Figure 6:
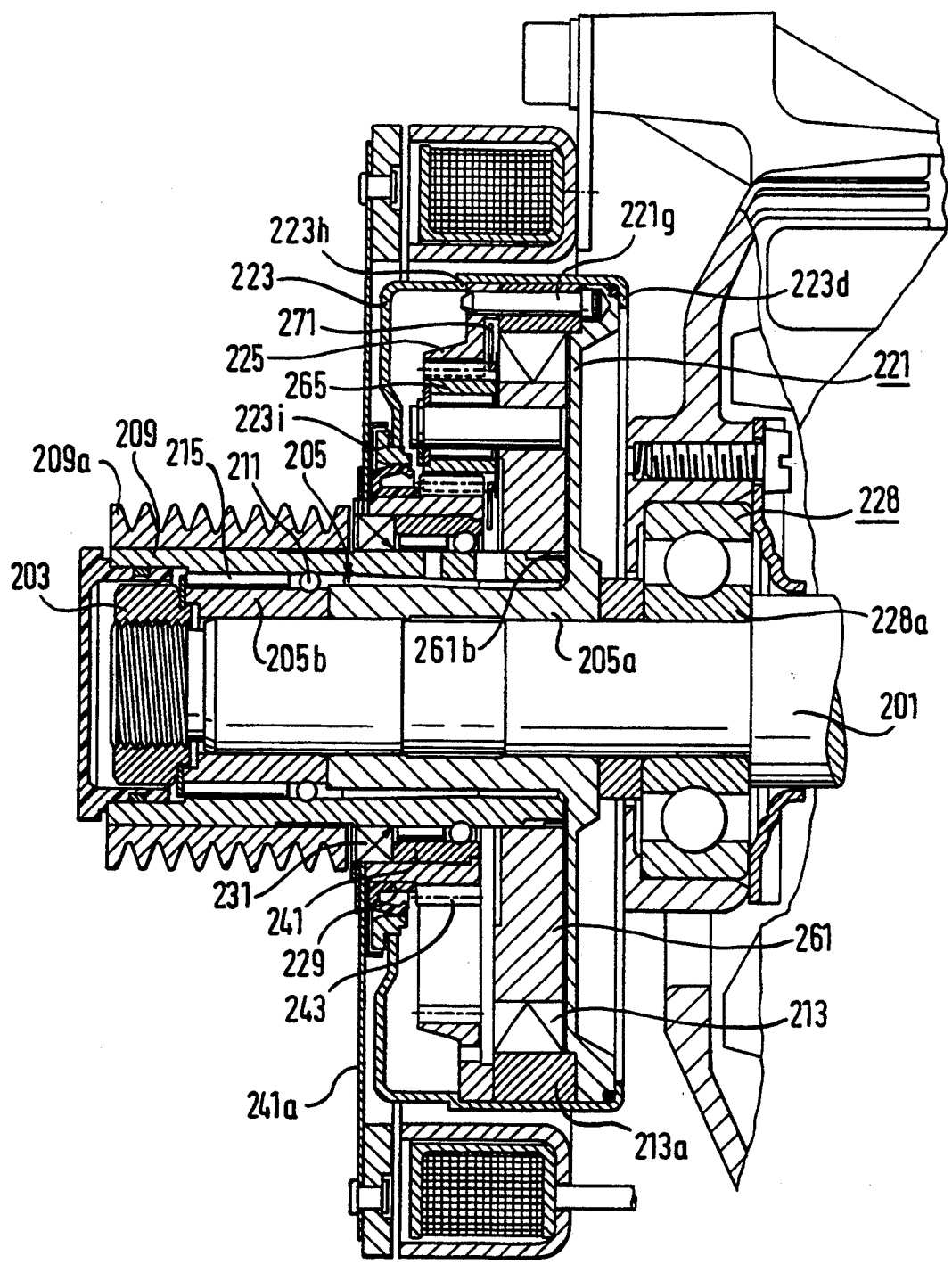

The embodiment of FIG. 6 is very similar to the embodiment of FIG. 5. In this embodiment, the input shaft sleeve unit 205 consists of two sections 205a and 205b. The roller bearings 215 and 211 are located on the sleeve section 205b. Such, the unit 209,205b, 241 to be manufactured from roller bearing steel is further reduced in volume and price. The second sleeve section 205a is integral with the ring wheel support member 221. The sun wheel 243 is fastened to the hub member 241, and the braking member 241a is fastened to the sun wheel 243. The ring wheel 225 is fastened to the ring wheel support member 221 by bolts 221g.

The planet wheel carrier 261, the planet wheels 265, the free wheel 213 with the outer ring member 213a thereof and the ring wheel 225 are inserted from the left-hand side into the ring wheel support member 221 with the outer ring member 213a of the free wheel 213 and the ring wheel 225 being secured therein by bolts 221g against rotation. Hereupon, the housing portion 223 is axially slided on the ring wheel support member 221 from the left-hand side, and sealingly curled at 223d with the ring wheel 225 being applied against a shoulder 223h of the housing portion 223. The housing portion 223 is provided with a sliding ring 223i.

The sun wheel 243 is slided from the right-hand side onto the hub member 241 of the bearing assembly 205b,209,241 and fastened thereon. The braking member 241a is fastened to the sun wheel 243.

The subunit consisting of the ring wheel support member 221, the sleeve section 205a, the free wheel 213, the planet wheel carrier 261, the planet wheels 265, the ring wheel 225, the housing portion 223 and the sliding ring 223i is combined by axial approach with the unit consisting of the sleeve section 205b, the sleeve member 209, the hub member 241, the sun wheel 243, the braking member 241a, the sealing ring 229, the sealing ring 231 and the belt pulley 209a. Such, the sun wheel 243 enters into engagement with the planet wheels 265, the sealing ring 231 enters into engagement with the sun wheel 243, the sealing ring 229 enters into engagement with the sliding ring 223i and the sleeve member 209 enters into engagement with the planet wheel carrier 261 at 261b for common rotation. The assembly such obtained can be slided now onto the input shaft member 201 and secured by the nut 203. Alternatively, a preliminary securing may be again made by inserting a bolt member and screwing the nut 203 onto the bolt member. For the rest, the embodiment of FIG. 6 corresponds to the embodiment of FIG. 5. Analogous parts are designated by the same reference numerals as in FIG. 5 increased by 100.

Figure 7:
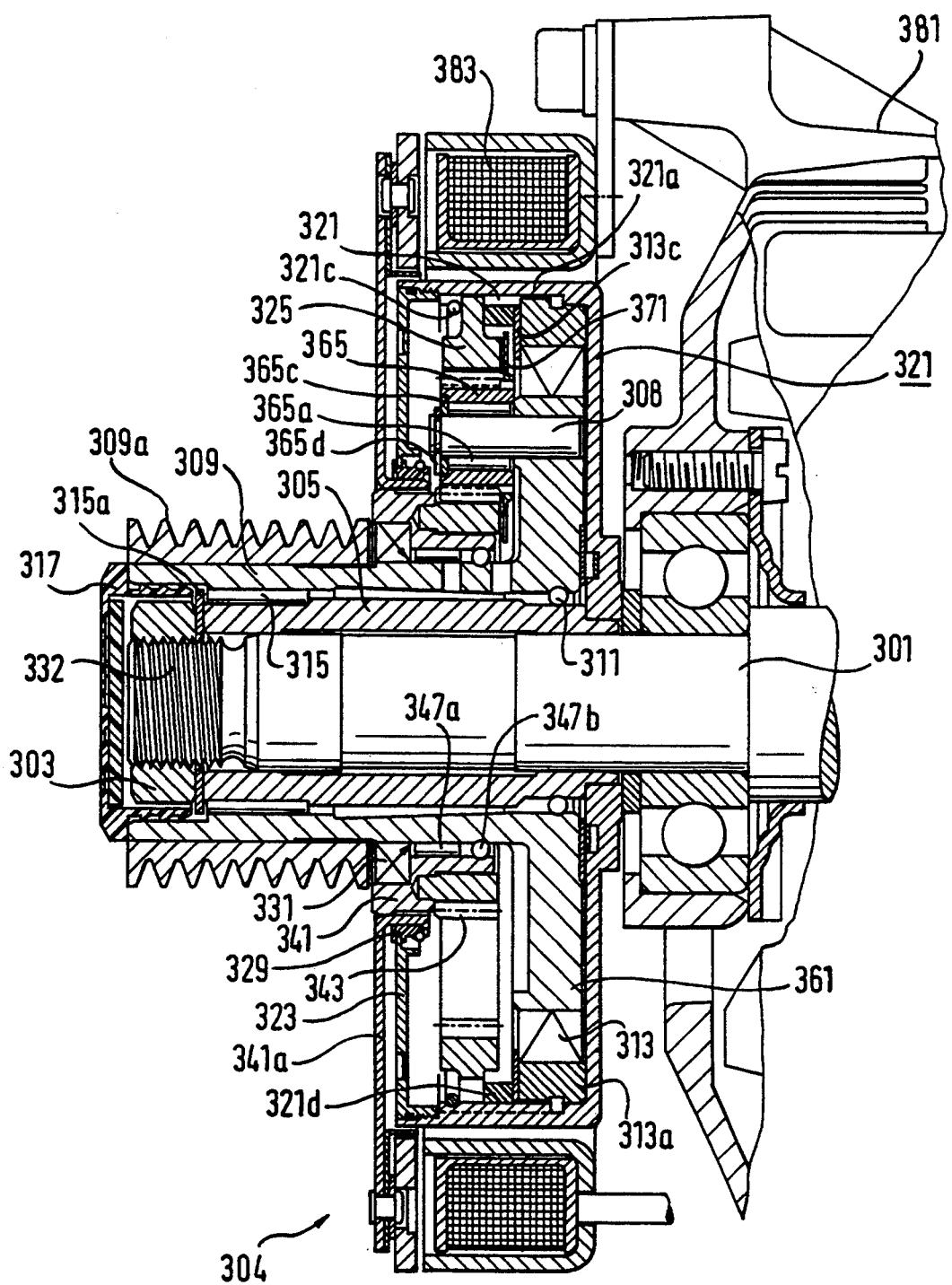

The embodiment of FIG. 7 is similar to the embodiment of FIG. 5. The most important difference is that the planet wheel carrier 361 is integral with the sleeve member 309. This embodiment requires, however, a different assembling method: One takes the ring wheel support member 321,321a with the integrally attached circumferential wall 321a. One inserts in this pot-shaped member 321,321a the outer ring 313a of the free wheel 313. One prepares the bearing unit consisting of the input shaft sleeve member 305 and the input torque transmission sleeve member 309 with the needle bearing 315 and the roller bearing 311 therebetween and with the planet wheel carrier portion 361 integrally cohering with the sleeve member 309 and with the planet wheel bolts 308 inserted into the planet wheel carrier 361. This unit 309,305,361,308 is inserted into the pot-shaped ring wheel support member 321,321a. Hereupon, the clamping rollers of the free wheel 313 are inserted between the planet wheel carrier 361 and the outer ring 313a of the free wheel 313, and the securing disc 313c is applied to the Outer ring 313a.

Hereupon, the planet wheels 365 with the conveyor disc 371 are mounted on the bolts 308 without the bearing needles 365a therebetween.

Hereupon, the sun wheel 343 is inserted in the center of the planet wheels 365. Hereupon, the hub member 341 is inserted such as to accommodate the sun wheel 343. Hereupon, the balls 347b are inserted between the hub member 341 and the sleeve member 309 according to usual ball bearing techniques. Hereupon, the needles 347a are inserted between the hub member 341 and the sleeve member 309. Hereupon, the needles 365a can be inserted between the planet wheels 365 and the bolts 308. Hereupon, the planet wheels 365 and the needles 365a are secured by the securing disc 365d. Hereupon, the spacer member 321d is applied to the securing disc 313c, and the ring wheel 325 is inserted into the pot-shaped ring wheel support member 321,321a and is secured by the spring clip 321c. Hereupon, the housing portion 323 with the sealing ring 329 is screwed into the pot-shaped ring wheel support member 321,321a. Hereupon, the braking member 341a is secured on the hub member 341 in sealing engagement with the sealing ring 329. Hereupon, the sealing ring 331 is inserted between the hub member 341 and the sleeve member 309. Hereupon, the belt pulley 309a is shrunk or pressed onto the sleeve member 309. Now, the gear unit 304 is preassembled for being slided onto the input shaft member 301 with the sleeve member 305 being radially seated on the input shaft member 301. Hereupon, the securing disc 315a is applied against the left-hand ends of the needles 315, which may be entered between the sleeve members 309 and 305 also in this stage immediately before inserting the securing disc 315a. Hereupon, the nut 303 is screwed onto the external thread 332 of the input shaft member 301, and the cover member 317 is inserted into the sleeve member 309.

It is needless to say that the second brake portion 383 must be fixed to the stator housing 381 before the sleeve member 309 is slided onto the input shaft member 301. For the rest, the components and the operation of the device according to FIG. 7 correspond to the device of FIGS. 2 and 3. Analogous parts are designated with the same reference numerals as in FIG. 1 increased by 300.

Figure 8:
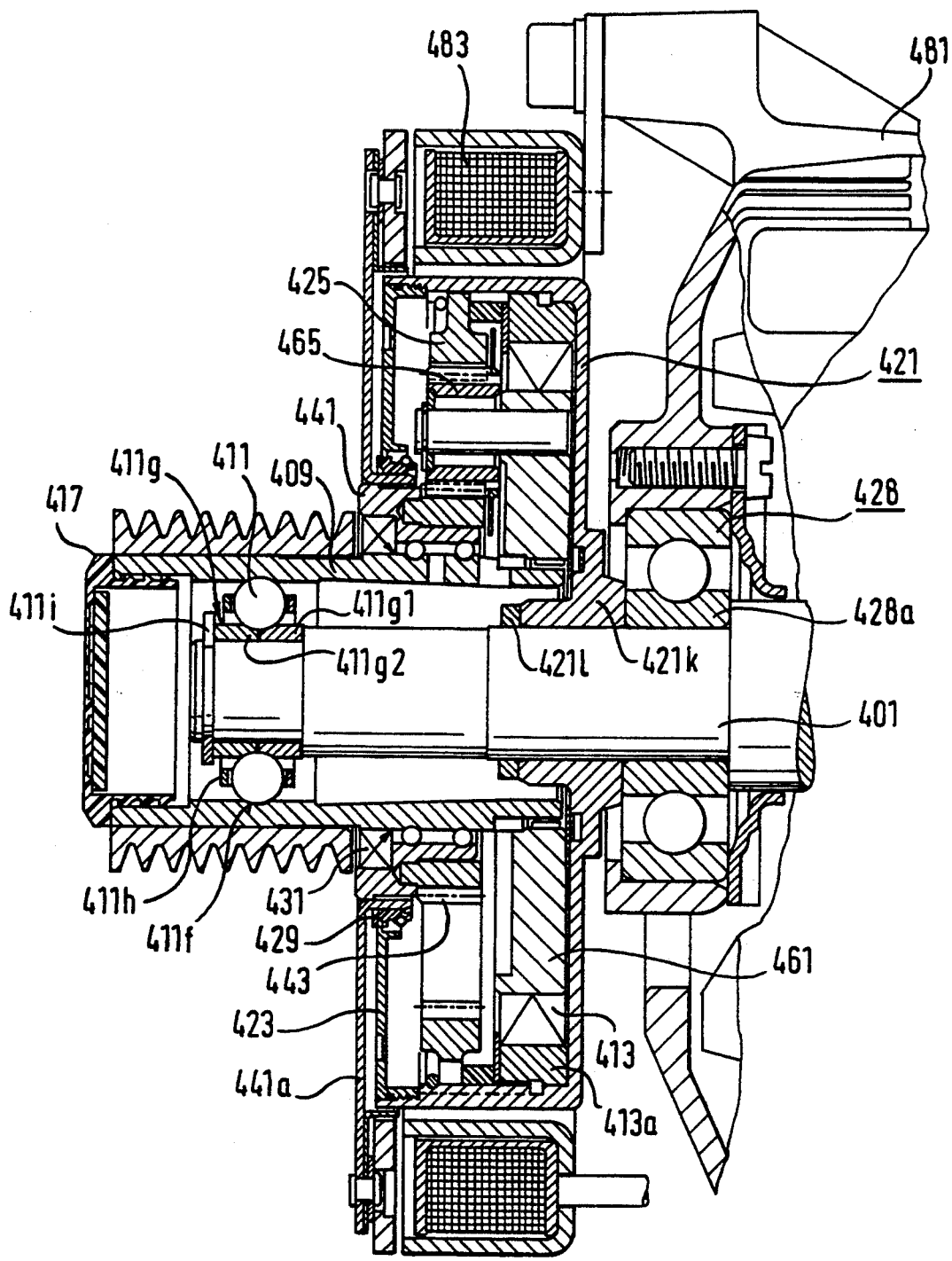

In the embodiment of FIG. 8, the input shaft unit 401 exclusively comprises an input shaft member 401 which is rotatably mounted by the ball bearing 428,428a.

The ring wheel support member 421 is shrunk or pressed on the input shaft member 401 by a hub portion 421k and additionally secured by a securing ring 421l.

The input torque transmission sleeve member 409 is rotatably mounted on the input shaft member 401 by a ball bearing 411. The balls of the ball bearing 411 are in rolling engagement with a concave track 411f of the sleeve member 409. Further, the balls of the ball bearing 411 are in rolling engagement with an internal, axially divided bearing ring 411g. The bearing ring 411g consists of two axially adjacent bearing ring portions 411g1 and 411g2. The balls of the ball bearing 411 are accommodated by a cage 411h. The internal bearing ring 411g is axially secured by a spring clip 411i on the input shaft member 401.

The gear unit 409,421,461,413,413a,465,425,441,443,423,441a, 431,429 is assembled as described with reference to FIG. 5 with the only difference that the input shaft sleeve member (see 105 in FIG. 5) is missing. This preassembled gear unit is now combined with the input shaft member 401 in pressing or shrinking the hub member 421k onto the input shaft member 401. Hereupon, the securing ring 421l is also pressed or shrunk onto the input shaft member 401. Hereupon, the bearing ring portion 411g1 is pressed onto the input shaft member 401, and the cage member 411h with the balls of the ball bearing 411 is inserted such that the balls of the ball bearing 411 come into rolling engagement with the internal track 411f of the sleeve member 409 and with the track portion of the bearing ring portion 411g1. Hereupon, the other bearing ring portion 411g2 is pressed onto the input shaft member 401 and secured by the spring clip 411i. Now, the cover member 417 can be inserted into the sleeve member 409. It is needless to say that the second brake portion 483 must be fastened to the stator housing 481 before the sleeve member 409 is pressed onto the input shaft member 401, if the braking member 441a has been installed on the hub member 441 before. It is possible also to fasten the braking member 441a in a last step on the hub member 441. In this case, the brake portion 483 can be fastened to the stator housing 481 immediately before this last step.

For the rest, the components and the operation of this device correspond to the device as shown in FIGS. 2, 3 and 5. Analogous parts are designated by the same reference numerals as in FIG. 5 increased by 300.

Coming back now to FIG. 5, this figure shows some further features which are applicable to all embodiments of the invention. These further features are not shown in the other embodiments.

In FIG. 5 the conveyer disc 171 is mounted on the planetary wheel 165. The conveyer disc may be fixed to the external teeth of the planetary wheel 165. For example, one can provide a teeth means along the radial inner circumference of the conveyer disc 171 which correspond to the teeth on the outer circumference of the planetary wheel 165. Such it is easy to center and to fasten the conveyer disc 171 on the planetary wheel 165.

One can further see from FIG. 5 that the conveyer disc 171 is provided with a slot 171a extending radially inwards from the outer circumference of the conveyer disc. A plurality of slots may be distributed along the periphery of the conveyer disc 171. These slots 171a are adapted to pick up lubricant from the lubricant ring 135 when the respective slot 171a immerges into the the lubricant ring.

The lubricant picked up by the slots 171a is to be thrown into the radial opening 116 for lubrication of the roller bearings 111 and 115. The lubricant thrown away by the slots 171a follows a definite trajectory which is dependent on the viscosity of the lubricant. One must take care that this trajectory hits into the opening 116. It is therefore necessary to maintain a definite phase relationship between the movement of the slots 171a and the opening 116. The opening 116 may be again elongate in circumferential direction.

One can further see from FIG. 5 that a fan 195 is non-rotatably mounted onto the input shaft member 101 on the side of the ball bearing means 128, 128a remote from the planetary gear means. With other terms, the fan 195 is located within the cavity 106a defined by the stator housing 106. This fan provides a cooling air flow through the passages 190, the passages 181d and the passages 181f.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A planetary gear driven power consuming unit (6), comprising stator means (81) and an input shaft unit (1,3,5) with an axis (A), for driving a driven unit within said stator means (81), said input shaft unit (1,3,5) being rotatably mounted with respect to said stator means (81) about said axis (A) through shaft bearing means (28,28a) and extending axially beyond said shaft bearing means (28,28a) towards a free end of said input shaft unit (1,3,5) and further comprising planetary gear means (25,43,61,63,65) including a sun wheel (43), a ring wheel (25), a planetary wheel carrier (61,63) and at least one planetary wheel (65) on said planetary wheel carrier (61,63), and further comprising free wheel means (13), a gear change brake unit (22) controllable by external control means (24) and a lubricant chamber (42) for receiving a liquid lubricant (35), an input torque transmission unit (9) of said planetary gear means (25,43,61,65) being in driving connection with said planetary wheel carrier (61,63), said ring wheel (25) being connected for common rotation with said input shaft unit (1,3,5), said gear change brake unit (22) being adapted for selectively either preventing a rotation of said sun wheel (43) with respect to said stator means (81) or releasing said sun wheel (43) for rotation about said axis (A) with respect to said stator means (81), said free wheel means (13) permitting rotation of said input shaft unit (1,3,5) with respect to said input torque transmission unit (9) in a predetermined sense of rotation in response to said gear change brake unit (22) preventing said sun wheel (43) from rotation with respect to said stator means (81), said free wheel means (13) transmitting an input torque from said input torque transmission unit (9) to said input shaft unit (1,3,5) in said predetermined sense of rotation in response to said gear change brake unit (22) releasing said sun wheel (43) for rotation about said axis (A) with respect to said stator means (81), said sun wheel (43) being hollow with a central passage therethrough, with a first axial end portion nearer to said shaft bearing means (28,28a) and with a second axial end portion nearer to said free end, said input torque transmission unit (9) extending through said hollow sun wheel (43) for transmitting an input torque from drive means engagement means (9a) located adjacent a second end portion side of said sun wheel (43) to a planetary wheel carrier portion (61) located adjacent a first end portion side of said sun wheel (43), said second axial end portion of said sun wheel (43) being connected for common rotation about said axis (A) with a sun wheel braking member (41a), said sun wheel braking member (41a) carrying a first brake portion (87) of said gear change brake unit (22), a second brake portion (83) of said gear change brake unit (22) being operationally fastened against rotation about said axis (A) with respect to said stator means (81), a ring wheel support member (21) connecting said ring wheel (25) with said input shaft unit (1,3,5) for common rotation being located on a side of said planetary wheel carrier portion (61) axially remote from said sun wheel (43), said input torque transmission unit (9) surrounding said input shaft unit (1,3,5) along an axial overlapping path, said input torque transmission unit (9) being rotatably mounted on and radially supported by said input shaft unit (1,3,5) within said axial overlapping path.

2. A power consuming unit as set forth in claim 1, said input shaft unit (1,3,5) comprising an input shaft member (1) rotatably mounted by said shaft bearing means (28,28a) and a prolongation unit (5), said input shaft member (1) and said prolongation unit (5) being connected in axial alignment by connection means (3, 28a), said connection means (3,28a) being resistant to a bending torque exerted onto said prolongation unit (5) about a bending axis perpendicular to said axis (A).

3. A power consuming unit as set forth in claim 2, said prolongation unit (5) comprising a prolongation sleeve (5), said connection means (3,28a) comprising a tensioning member (3) within said prolongation sleeve (5), said tensioning member (3) being in screw connection with said input shaft member (1) and axially pressing said prolongation sleeve (5) against abutment face means (28a) axially fixed with respect to said input shaft member (1).

4. A power consuming unit as set forth in claim 2, said input torque transmission unit (9) being rotatably mounted on said prolongation unit (5).

5. A power consuming unit as set forth in claim 3, said input torque transmission unit (9) being rotatably mounted on said prolongation sleeve (5).

6. A power consuming unit as set forth in claim 2, said ring wheel support member (21) being fastened for common rotation with said input shaft unit (1,3,5) by axially clamping said ring wheel support member (21) between said input shaft member (1) and said prolongation unit (5).

7. A power consuming unit as set forth in claim 1, said input shaft unit (101,103,105) comprising an input shaft member (101) rotatably mounted by said shaft bearing means (128,128a) and input shaft sleeve means (105) surrounding said input shaft member (101), said input shaft sleeve means (105) being fastened on said input shaft member (101), said input torque transmission unit (109) being rotatably mounted on said input shaft sleeve means (105).

8. A power consuming unit as set forth in claim 7, said input shaft member (101) being provided adjacent said free end of said input shaft unit (101,103,105) with a securing member (103), said securing member (103) acting onto an adjacent end of said input shaft sleeve means (105) and pressing said input shaft sleeve means (105) against abutment face means (128a) fixed with respect to said input shaft member (101).

9. A power consuming unit as set forth in claim 8, said securing member (103) being a nut screwed onto external thread means (132) of said input shaft member (101), said external thread means (132) extending axially beyond said input shaft sleeve means (105).

10. A power consuming unit as set forth in claim 7, said input shaft sleeve means (105) comprising one single input shaft sleeve member (105) extending in axial direction substantially between said free end of said input shaft unit (101,103,105) and said ring wheel support member (121).

11. A power consuming unit as set forth in claim 7, said input shaft sleeve means (205) comprising a first input shaft sleeve section (205a) nearer to said shaft bearing means (228,228a) and a second input shaft sleeve section nearer to said free end of said input shaft unit (201,203,205), said input torque transmission unit (209) being rotatably mounted on said second input shaft sleeve section (205b).

12. A power consuming unit as set forth in claim 7, said ring wheel support member (121) being fastened to said input shaft unit (101) through or by said input shaft sleeve means (105).

13. A power consuming unit as set forth in claim 12, said ring wheel support member (121) being axially clamped between said input shaft sleeve means (105) and abutment face means (128a) fixed with respect to said input shaft member (101).

14. A power consuming unit as set forth in claim 12, said ring wheel support member (121) being centered on a tail section (105a) reduced in diameter of said input shaft sleeve means (105).

15. A power consuming unit as set forth in claim 14, said ring wheel support member (121) being axially clamped between a shoulder face (105b) of said tail section (105a) of said input shaft sleeve means (105) and abutment face means (128a) fixed with respect to said input shaft member (101).

16. A power consuming unit as set forth in claim 12, said ring wheel support member (221) being integral with at least an input shaft section (205a) of said input shaft sleeve means (205).

17. A power consuming unit as set forth in claim 1, said input shaft unit (401) comprising an input shaft member (401) rotatably mounted by said shaft bearing means (428,428a) and extending up to said free end of said input shaft unit, said input torque transmission unit (409) being rotatably mounted on said input shaft member (401), said ring wheel support member (421) being axially and angularly fixed with respect to said input shaft member (401).

18. A power consuming unit as set forth in claim 17, said ring wheel support member (421) being press-fitted on said input shaft member (401).

19. A power consuming unit as set forth in claim 1, said input torque transmission unit (9) comprising an input torque transmission sleeve (9) extending in axial direction between said planetary wheel carrier portion and said drive means engagement means (9a).

20. A power consuming unit as set forth in claim 19, said drive means engagement means (109a) being provided by a drive means engagement member (109a) surrounding said input torque transmission sleeve (109) and being fastened thereon for common rotation therewith.

21. A power consuming unit as set forth in claim 20, said drive means engagement means (9a) being integrally shaped on said input torque transmission sleeve (9).

22. A power consuming unit as set forth in claim 1, said drive means engagement means (9a) being shaped as a belt pulley.

23. A power consuming unit as set forth in claim 1, said input torque transmission unit (9) being rotatably mounted on said input shaft unit (1,3,5) in using roller bearing means (11,15) such as ball bearing means (11) and/or needle bearing means (15).

24. A power consuming unit as set forth in claim 23, at least one of said roller bearing means (11,15) having roller members such as balls or needles in direct rolling contact with a circumferential rolling track (11s, 11t, 15s, 15t) shaped on at least one of said input shaft unit (1,3,5) and said input torque transmission unit (9).

25. A power consuming unit as set forth in claim 24, said roller members being in rolling contact with a track (11t,15t) shaped on input shaft sleeve means (5) of said input shaft unit (1,3,5).

26. A power consuming unit as set forth in claim 24, said roller members being in rolling contact with a track (11s,15s) shaped on an input torque transmission sleeve (9) of said input torque transmission unit (9).

27. A power consuming unit as set forth in claim 1, said free wheel means (13) being located radially between an input torque transmission sleeve (9) of said input torque transmission unit (9) and said input shaft unit (1,3,5).

28. A power consuming unit as set forth in claim 1, said free wheel means (13) being provided operationally between said planetary wheel carrier portion (61) and said ring wheel support member (21).

29. A power consuming unit as set forth in claim 28, said free wheel means (13) being located between a radially outwards directed circumferential face of said planetary wheel carrier portion (61) and a radially inwards directed circumferential face connected for common rotation with said ring wheel support member (21).

30. A power consuming unit as set forth in claim 1, at least one of said sun wheel (43) and said sun wheel braking member (41a) being rotatably mounted on said input torque transmission unit (9) by roller bearing means (47), such as ball bearing means or needle bearing means, at least part of the roller members of said roller bearing means (47) being in rolling engagement with a circumferential track (47t, 47s) shaped on one of an input torque transmission sleeve (9) of said input torque transmission unit (9), said sun wheel (43) and said sun wheel braking member (41a).

31. A power consuming unit as set forth in claim 1, at least one of said sun wheel braking member (41a) and said sun wheel (43) comprising a hub member (41) rotatably mounted on said input torque transmission unit (9).

32. A power consuming unit as set forth in claim 31, said hub member (41) being rotatably mounted on an input torque transmission sleeve (9) of said input torque transmission unit (9) by roller bearing means (47) such as ball bearing means or needle bearing means, said roller bearing means comprising roller members in rolling engagement with respective tracks (47t, 47s) shaped on said input torque transmission sleeve (9) and said hub member (41).

33. A power consuming unit as set forth in claim 1, at least one of said sun wheel (143) and said sun wheel braking member (141a) being manufactured separately from and being fastened to a common hub member (141) in respective operational positions.

34. A power consuming unit as set forth in claim 1, said sun wheel braking member (141a) being shaped as a flange member (141a) following a plane substantially orthogonal to said axis (A).

35. A power consuming unit as set forth in claim 1, said first brake portion (187) being axially movable with respect to said sun wheel braking member (141a).

36. A power consuming unit as set forth in claim 1, said second brake portion (183) of said gear change brake unit (122) and said planetary gear means (143,161,108,165,125) having a common plane orthogonal to said axis (A).

37. A power consuming unit as set forth in claim 1, said second brake portion (183) of said gear change brake unit (122) being substantially within an axial extent of an assembly comprising said planetary gear means (143,161,108,165,125), said free wheel means (113), said ring wheel support member (121) and said lubricant chamber (142).

38. A power consuming unit as set forth in claim 1, said lubricant chamber (142) being confined by first side wall means (121) located on the first end portion side of said sun wheel (143) and second side wall means (123) located on the second end portion side of the sun wheel (143), said first and second side wall means (121,123) being axially connected by circumferential chamber wall means (121a), said second brake portion (183) surroundingly overlapping said circumferential chamber wall means (121a) in axial direction.

39. A power consuming unit as set forth in claim 38, said first side wall means (121) comprising said ring wheel support member (121).

40. A power consuming unit as set forth in claim 38, said circumferential chamber wall means (121a) being integral with at least one of said first side wall means (121) and said second side wall means (123).

41. A power consuming unit as set forth in claim 38, said second side wall means (123) being sealed with respect to a hub member (141) of at least one of said sun wheel (143) and said sun wheel braking member (141a) by first rotation permitting sealing means (129), said hub member (141) being sealed with respect to said input torque transmission unit (109) by second rotation permitting sealing means (131).

42. A power consuming unit as set forth in claim 38, said first side wall means (121) being sealed with respect to said input shaft unit (101,103,105).

43. A power consuming unit as set forth in claim 38, said first side wall means (121) being sealed with respect to input shaft sleeve means (105) of said input shaft unit (101,103,105), said input shaft sleeve means (105) being sealed with respect to an input shaft member of said input shaft unit (101,103,105).

44. A power consuming unit as set forth in claim 1, said input torque transmission unit (109) being sealingly closed adjacent an end thereof remote from said shaft bearing means (128,128a), said end of said input shaft unit (101,103,105) being located inside said sealingly closed end of said input torque transmission unit (109).

45. A power consuming unit as set forth in claim 1, said lubricant chamber (142) containing a volume of lubricant independent of external operational lubricant supply means.

46. A power consuming unit as set forth in claim 1, said lubricant chamber (42) being an annular chamber about said axis (A), at least one of said planetary gear means (43,61,63,8,65,25) and said free wheel means (13) being housed within said annular lubricant chamber (42), said annular lubricant chamber (42) being rotatable about said axis (A) in response to rotation of said input torque transmission unit (9), said liquid lubricant in said annular lubricant chamber (42) forming a lubricant ring (35) adjacent circumferential chamber wall means of said annular lubricant chamber (42) in response to centrifugal forces, lubricant conveying means (19,44,16) being located within said annular lubricant chamber (42) for conveying lubricant from said lubricant ring (35) towards locations (47,11,15) requiring lubrication.

47. A power consuming unit as set forth in claim 46, said lubricant ring (35) being in operation radially outside of rotatable sealing means (29,31) of said lubricant chamber (42).

48. A power consuming unit as set forth in claim 46, said lubricant conveying means being adapted to direct a lubricant beam or lubricant droplets towards at least one substantially radial opening (16) extending through an input torque transmission sleeve (9) of said input torque transmission unit (9) such that said lubricant beam or said lubricant droplets, respectively, can pass through said at least one opening (16) into an interspace between said input torque transmission sleeve (9) and said input shaft unit (1,3,5) for further distribution towards bearing means (15,11) provided within said interspace and used for rotatably mounting said input torque transmission sleeve (9) on said input shaft unit (1,3,5).

49. A power consuming unit as set forth in claim 48, said at least one radially extending opening (16) being of elongate cross section in circumferential direction.

50. A power consuming unit as set forth in claim 46, said lubricant conveying means (171,116) directing a lubricant beam or lubricant droplets against scattering face means (105c).

51. A power consuming unit as set forth in claim 46, said lubricant conveying means (171,116) comprising an internal circumferential face (109d) of an input torque transmission sleeve (109) of said input torque transmission unit (109), said internal circumferential face (109d) being divergent in axial direction, lubricant allotting means (105c) being allocated to said divergent circumferential face (109d) such that lubricant received by said divergent circumferential face (109d) flows along said divergent circumferential face (109d) in axial direction under the influence of centrifugal forces.

52. A power consuming unit as set forth in claim 51, said divergent circumferential face (109d) being axially confined by a radially inwards directed sill (109e).

53. A power consuming unit as set forth in claim 52, said input torque transmission sleeve (109) being provided with at least one radially directed perforation (109f) permitting lubricant flow therethrough in radially outwards direction starting from said divergent circumferential face (109d).

54. A power consuming unit as set forth in claim 46, said lubricant conveying means (19,44,16) comprising a lubricant pick-up tube (19) having a radially outer end (18) entering into said lubricant ring (35) and having pick-up means (18) directed in substantially circumferential direction about said axis (A), said pick-up tube (19) being rotatable with respect to said lubricant chamber (42).

55. A power consuming unit as set forth in claim 54, said lubricant chamber (42) being confined by a chamber housing (40) mounted for common rotation with said ring wheel (25), said pick-up tube (19) being connected for common rotation with said sun wheel (43).

56. A power consuming unit as set forth in claim said lubricant chamber (42) being confined by a chamber housing (40), said chamber housing (40) being mounted for common rotation with said ring wheel (25), said pick-up tube (19) being mounted for common rotation with said planetary wheel carrier (61), said pick-up tube (19) being at least partially located in a space layer orthogonal with respect to said axis (A) and containing said at least one planetary wheel (65).

57. A power consuming unit as set forth in claim 46, said conveying means (171,116) comprising at least one conveyer disc (171) mounted for common rotation with said at least one planetary wheel (165), said conveyer disc (171) immerging with at least a respective radially outer circumferential portion thereof into said lubricant ring and being directed with a respective radially inner circumferential portion towards a lubricant droplet receiving location (116), said respective radially outer circumferential portion being wetted by said lubricant when immerging into said lubricant ring and throwing droplets towards said droplet receiving location (116) when arriving at a position adjacent said droplet receiving location (116) during movement of the planetary wheel (165).

58. A power consuming unit as set forth in claim 57, said conveyer disc (171) cooperating with a radial opening (116) extending through an input torque transmission sleeve (109) of said input torque transmission unit (109).

59. A power consuming unit as set forth in claim 1, said free wheel means (113) being at least partially immerged into a lubricant ring (35) within said lubricant chamber (42).

60. A power consuming unit as set forth in claim 1, said ring wheel (25) having radially inner teeth means, said teeth means being at least partially immerged into a lubricant ring (35) within said lubricant chamber (42).

61. A power consuming unit as set forth in claim 1, said ring wheel (25) being fastened with respect to said lubricant chamber (42).

62. A power consuming unit as set forth in claim 1, said input torque transmission unit (9), said planetary gear means (43,61,63,65,25) and said free wheel means (13) being at rest with respect to said input shaft unit (1,3,5), when said input shaft unit (1,3,5)

is directly driven from said input torque transmission unit (9) through said free wheel means (13).

63. A power consuming unit as set forth in claim 1, said second brake portion (83) being supported through brake portion support means (85) by said stator means (81).

64. A power consuming unit as set forth in claim 63, said stator means (181) comprising an end wall (181e) ajacent said shaft bearing means (128,128a), said end wall (181e) being provided with cooling air openings (181d), said cooling air openings (181d) being open to the surrounding atmosphere through air passages (190)

65. A power consuming unit as set forth in claim 1, said power consuming unit (6) being an electric power generator.

66. A power consuming unit as set forth in claim 1, said power consuming unit (6) being an auxiliary power consuming unit of a motor vehicle such as a power generator, an oil pump, a compressor or the like.

67. A power consuming unit as set forth in claim 1, said gear change brake unit (22) being an electro-magnetically controlled brake unit (22).

68. A power consuming unit as set forth in claim 1, said gear change brake unit (22) being frictional brake unit permitting a smooth reduction of the r.p.m. of said sun wheel (43), possibly down to standstill, with respect to said stator means (81).

69. A power consuming unit as set forth in claim 67, said second brake portion (83) of said gear change brake unit (22) comprising an electro-magnetic coil unit (83) and said first portion of said gear change brake unit (22) comprising an axially movable armature (87).

70. A power consuming unit as set forth in claim 69, said electro-magnetic coil unit (83) being of annular shape and arranged in substantially coaxial position around said planetary gear means (43,61,63,65,25) and having a common plane with said planetary gear means.

71. A power consuming unit as set forth in claim 70, said planetary 9ear means (143,161,108,163,129), said lubricant chamber (142), said gear change brake unit (122) and said sun wheel braking member (141a) having a flat virtual enveloping disc, said driving means engagement means (109a) having a virtual enveloping cylinder projecting from a side wall of said flat virtual enveloping disc remote from said shaft bearing means (128,128a), said virtual enveloping cylinder having a diameter considerably smaller than the diameter of said flat virtual enveloping disc.

72. A power consuming unit as set forth in claim 71, the axial width of said virtual flat enveloping disc substantially corresponding to the sum of individual axial dimensions of said sun wheel (143), said sun wheel braking member (141a), said planetary wheel carrier portion (161), said ring wheel support member (1217 and a side wall (123) of said lubricant chamber (142) remote from said ring wheel support member (121).

73. A power consuming unit as set forth in claim 72, the axial width of said virtual flat enveloping disc being less than 135%, preferably less than 130%, of said sum.

74. A power consuming unit as set forth in claim 71, the diameter of said virtual enveloping cylinder being less than 40% of the diameter of said virtual flat enveloping disc.

75. A power consuming unit as set forth in claim 74, the diameter of said virtual enveloping cylinder being less than 30% of the diameter of said flat virtual enveloping disc.

76. A power consuming unit as set forth in claim 71, the diameter of said virtual flat enveloping disc being less than 9 times, preferably less than 8.5 times the diameter of said input shaft unit (1,3,5) as measured axially inside said shaft bearing means (128, 128a).

77. A power consuming unit as set forth in claim 71, the axial width of said virtual enveloping cylinder corresponding substantially to the width of a belt pulley.

78. A power consuming unit as set forth in claim 71, the diameter of said virtual enveloping cylinder being less than 3 times the diameter of said input shaft unit as measured inside said shaft bearing means (128,128a).

79. A power consuming unit as set forth in claim 1, said planetary gear means (43,61,63,65,25) providing a first transmission ratio of 1:1 and a second transmission ratio of less than 1.70:1 between said input shaft unit (1,3,5) and said input torque transmission unit (9) with the input shaft unit (1,3,5) having the higher r.p.m., respectively.

80. A power consuming unit as set forth in claim 1, said gear change braking unit (22) being controlled by a control unit (24) in response to the r.p.m. of the input torque transmission unit (9) such that the r.p.m. of said input shaft unit (1,3,5) is increased with respect to the r.p.m. of the input torque transmission unit (9) when the r.p.m. of the input torque transmission unit (9) is reduced below a predetermined r.p.m. value.

81. A power consuming unit as set forth in claim 80, said increase of the r.p.m. of said input shaft unit (1,3,5) beyond said r.p.m. of said input torque transmission unit (9) in response to decrease of said input torque transmission unit (9) below said predetermined r.p.m. value being additionally responsive to a signal (24b) representing a need for r.p.m. increase of said power consuming unit (6).

82. A power consuming unit as set forth in claim 1, said input shaft unit (1,3,5) having a section extending beyond said shaft bearing means (28,28a) of said stator means (81) towards said free end, said section having no further radial support from said stator means.

83. For a planetary gear driven power consuming unit
comprising stator means (81) and an input shaft unit with an axis (A) for driving a driven unit (2) within said stator means, said input shaft unit (1,3,5) being rotatably mounted with respect to said stator means (81) about said axis (A) through shaft bearing means (28,28a) and extending towards a free end of said input shaft unit (1,3,5), and further comprising planetary gear means (25,43, 61,63,65) including a sun wheel (43), a ring wheel (25), a planetary wheel carrier (61,63) and at least one planetary wheel (65) on said planetary wheel carrier (61,63), and further comprising free wheel means (13), a gear change brake unit (22) controllable by external control means (24) and a lubricant chamber (42) for receiving a liquid lubricant (35), an input torque transmission unit (9) of said planetary gear means being in driving connection with said planetary wheel carrier (61,63), said ring wheel (25) being connected for common rotation with said input shaft unit (1,3,5), said gear change brake unit (22) being adapted for selectively either preventing a rotation of said sun wheel (43) with respect to said stator means (81) or releasing said sun wheel (43) for rotation about said axis (A) with respect to said stator means (81), said free wheel means (13) permitting rotation of said input shaft unit (1,3,5) with respect to said input torque transmission unit (9) in a predetermined sense of rotation in response to said gear change brake unit (22) preventing said sun wheel (43) from rotation with respect to said stator means (81), said free wheel means (13) transmitting an input torque from said input torque transmission unit (9) to said input shaft unit (1,3,5) in said predetermined sense of rotation in response to said gear change brake unit (22) releasing said sun wheel (43) for rotation about said axis (A) with respect to said stator means (81), said sun wheel (43) being hollow with a central passage therethrough, with a first axial end portion nearer to said shaft bearing means (28,28a) and with a second axial end portion nearer to said free end, said input torque transmission unit (9) extending through said hollow sun wheel (43) for transmitting an input torque from drive means engagement means (9a) located adjacent a second end portion side of said sun wheel (43) to a planetary wheel carrier portion (61) located adjacent a first end portion side of said sun wheel (43), said second axial end portion of said sun wheel (43) being connected for common rotation about said axis (A) with a sun wheel braking member (41a), said sun wheel braking member (41a) carrying a first brake portion (87) of said gear change brake unit (22), a second brake portion (83) of said gear change brake unit (22) being operationally fastened against rotation about said axis (A) with respect to said stator means (81), a ring wheel support member (21) connecting said ring wheel (25) with said input shaft unit (1,3,5) for common rotation being located on a side of said planetary wheel carrier portion (61) axially remote from said sun wheel (43), said input torque transmission unit (9) surrounding said input shaft unit (1,3,5) along an axial overlapping section, said input torque transmission unit (9) being rotatably mounted on and radially supported by said input shaft unit (1,3,5) within said axial overlapping section, a group of components at least comprising said input torque transmission unit (9), said planetary gear means (43,25,61,63,65), said free wheel means (13), said sun wheel braking member (41a), said ring wheel support member (21), said lubricant chamber (42) and said input torque transmission unit (9).

84. A group of components as set forth in claim 83, said components being preassembled such as to form a preassembled gear unit (4) with said preassembled components being in relative operational positions corresponding to their relative operational positions within the completed planetary gear driven power consuming unit (6), said ring wheel support member (21) being adapted for being drivingly fastened to an input shaft member (1) rotatably mounted with respect to said stator means (81) by said shaft bearing means (28,28a).

85. A group of components as set forth in claim 84, further comprising a prolongation unit (5) adapted to be non-rotatably fastened to said input shaft member (1) in prolongation alignment thereto, said prolongation unit (5) being rotatably mounted with respect to said input torque transmission unit (9).

86. A group of components as set forth in claim 84 further comprising input shaft sleeve means (10b) adapted to be non-rotatably fastened to said input shaft member (101) in surrounding relationship thereto, said input shaft sleeve means (105) being rotatably mounted with respect to said input torque transmission unit (109).

87. A group of components as set forth in claim 84, said group of components being secured in preassembled condition by releasable securing means.

88. A group of components as set forth in claim 84, said lubricant chamber (42) being filled with a volume of liquid lubricant.

89. A planetary gear driving mechanism with a changeable transmission ratio comprising in coaxial arrangement about an axis (A) a sun wheel (43), a planetary wheel carrier (61), at least one planetary wheel (65), a ring wheel (25), free wheel means (13), a lubricant chamber (42) and a gear change brake unit (22), said gear change brake unit (22) being of annular shape and surrounding said ring wheel (25) with a common plane orthogonal to said axis (A) containing said ring wheel (25) and said gear change brake unit (22), said gear change brake unit (22) comprising an annular electromagnetic coil (83) surrounding said ring wheel (25) and an armature (87) movable in an axial direction with respect to said annular electro-magnetic coil (83).

90. A method of assembling a planetary gear driven power consuming unit, said power consuming unit (6), comprising stator means (81) and an input shaft unit (1,3,5) with an axis (A), for driving a driven unit within said stator means (81), said input shaft unit (1,3,5) being rotatably mounted with respect to said stator means (81) about said axis (A) through shaft bearing means (28,28a) and extending axially beyond said shaft bearing means (28,28a) towards a free end of said input shaft unit (1,3,5) and further comprising planetary gear means (25,43,61,63,65) including a sun wheel (43), a ring wheel (25), a planetary wheel carrier (61,63) and at least one planetary wheel (65) on said planetary wheel carrier (61,63), and further comprising free wheel means (13), a gear change brake unit (22) controllable by external control means (24) and a lubricant chamber (42) for receiving a liquid lubricant (35), an input torque transmission unit (9) of said planetary gear means (25,43,61,65) being in driving connection with said planetary wheel carrier (61,63), said ring wheel (25) being connected for common rotation with said input shaft unit (1,3,5), said gear change brake unit (22) being adapted for selectively either preventing a rotation of said sun wheel (43) with respect to said stator means (81) or releasing said sun wheel (43) for rotation about said axis (A) with respect to said stator means (81), said free wheel means (13) permitting rotation of said input shaft unit (1,3,5) with respect to said input torque transmission unit (9) in a predetermined sense of rotation in response to said gear change brake unit (22) preventing said sun wheel (43) from rotation with respect to said stator means (81), said free wheel means (13) transmitting an input torque from said input torque transmission unit (9) to said input shaft unit (1,3,5) in said predetermined sense of rotation in response to said gear change brake unit (22) releasing said sun wheel (43) for rotation about said axis (A) with respect to said stator means (81), said sun wheel (43) being hollow with a central passage therethrough, with a first axial end portion nearer to said shaft bearing means (28,28a) and with a second axial end portion nearer to said free end, said input torque transmission unit (9) extending through said hollow sun wheel (43) for transmitting an input torque from drive means engagement means (9a) located adjacent a second end portion side of said sun wheel (43) to a planetary wheel carrier portion (61) located adjacent a first end portion side of said sun wheel (43), said second axial end portion of said sun wheel (43) being connected for common rotation about said axis (A) with a sun wheel braking member (41a), said sun wheel braking member (41a) carrying a first brake portion (87) of said gear change brake unit (22), a second brake portion (83) of said gear change brake unit (22) being operationally fastened against rotation about said axis (A) with respect to said stator means (81), a ring wheel support member (21) connecting said ring wheel (25) with said input shaft unit (1,3,5) for common rotation being located on a side of said planetary wheel carrier portion (61) axially remote from said sun wheel (43), said input torque transmission unit (9) surrounding said input shaft unit (1,3,5) along an axial overlapping path, said input torque transmission unit (9) being rotatably mounted on and radially supported by said input shaft unit (1,3,5) within said axial overlapping path, said method comprising preassembling at least said sun wheel (43), said planetary wheel carrier (61,63), said planetary wheel (65), said ring wheel (25), said free wheel means (13) and said lubricant chamber (42) on said input torque transmission unit (9) and hereupon rotatably mounting said input torque transmission unit (9) on an input shaft member (1) of said input shaft unit (1,3,5).

91. A method of assembling as set forth in claim 90, said preassembling further comprising rotatably mounting said input torque transmission unit (9) on an input shaft sleeve unit (5) of said input shaft unit (1,3,5), said input shaft sleeve unit (5) being subsequent to said preassembling non-rotatably mounted on said input shaft member (1).

92. A planetary gear driven electric power generator (6), comprising stator means (181) and an input shaft unit (101,103,105) with an axis (A), for driving a rotor (102) with respect to said stator means (181), said input shaft unit (101,103,105) being rotatably mounted with respect to said stator means (181) about said axis (A) through shaft bearing means (128,128a) and extending axially beyond said shaft bearing means (128,128a) towards a free end (101) of said input shaft unit (101, 103,105) and further comprising planetary gear means (125,143,161,163,165) including a sun wheel (143), a ring wheel (125), a planetary wheel carrier (161,163) and at least one planetary wheel (165) on said planetary wheel carrier (161,163), and further comprising free wheel means (113), a gear change brake unit (122) controllable by external control means (24) and a lubricant chamber (142) for receiving a liquid lubricant (135), an input torque transmission unit (109) of said planetary gear means (125,143,161,165) being in driving connection with said planetary wheel carrier (161,163), said ring wheel (125) being connected for common rotation with said input shaft unit (101,103,105), said gear change brake unit (122) being adapted for selectively either preventing a rotation of said sun wheel (143) with respect to said stator means (181) or releasing said sun wheel (143) for rotation about said axis (A) with respect to said stator means (181), said free wheel means (113) permitting rotation of said input shaft unit (101,103, 105) with respect to said input torque transmission unit (109) in a predetermined sense of rotation in response to said gear change brake unit (122) preventing said sun wheel (143) from rotation with respect to said stator means (181), said free wheel means (113) transmitting an input torque from said input torque transmission unit (109) to said input shaft unit (101,103,105) in said predetermined sense of rotation in response to said gear change brake unit (122) releasing said sun wheel (143) for rotation about said axis (A) with respect to said stator means (181), said sun wheel (143) being hollow with a central passage therethrough, with a first axial end portion nearer to said shaft bearing means (128,128a) and with a second axial end portion nearer to said free end (101a), said input torque transmission unit (109) extending through said hollow sun wheel (143) for transmitting an input torque from drive means engagement means (109a) located adjacent a second end portion side of said sun wheel (143) to a planetary wheel carrier portion (161) located adjacent a first end portion side of said sun wheel (143), said second axial end portion of said sun wheel (143) being connected for common rotation about said axis (A) with a sun wheel braking member (141a), said sun wheel braking member (141a) carrying a first brake portion (187) of said gear change brake unit (122), a second brake portion (183) of said gear change brake unit (122) being operationally fastened against rotation about said axis (A) with respect to said stator means (181), a ring wheel support member (121) connecting said ring wheel (125) with said input shaft unit (101, 103,105) for common rotation being located on a side of said planetary wheel carrier portion (161) axially remote from said sun wheel (143), said input torque transmission unit (109) surrounding said input shaft unit (101,103,105) along an axial overlapping path, said input torque transmission unit (109) being rotatably mounted on and radially supported by said input shaft unit (101,103,105) within said axial overlapping path, said input shaft unit (101,103,105) being provided with a cooling fan (195) mounted on said input shaft unit (101,103,105) for common rotation therewith, said cooling fan (195) being located on said input shaft unit (101,103,105) on a side of said shaft bearing means (128,128a) remote from said free end (101a).

93. A planetary gear driven electric power generator as set forth in claim 147, said stator means (181) comprising a stator housing (181), said stator housing (181) having an end wall (181e) axially adjacent said input shaft bearing means (128,128a), said end wall (181e) being provided with cooling air passage means (181d) radially adjacent said shaft bearing means (128,128a), said second brake portion (183) being fastened to said stator housing (181) adjacent said end wall (181e) by second brake portion fastening means (181a, 181b), said second brake portion fastening means (181a, 181b) providing further cooling air passage means (190), said cooling fan (195) being provided within said stator housing (181) and being adapted to provide a cooling air stream through said cooling air passage means (181d) of said end wall (181e) and said further cooling air passage means (190).

* * * * *

UNITED STATES PATENT AND TRADEMARK OFFICE
CERTIFICATE OF CORRECTION

PATENT NO. : 5,358,456
DATED : October 25, 1994
INVENTOR(S) : Deppert et al.

It is certified that error appears in the above-indentified patent and that said Letters Patent is hereby corrected as shown below:

Col. 2, line 65, "preventin" should read --preventing--;
Col. 4, line 44, "Alternativley" should read --Alternatively--;
Col. 5, line 53, "outwards" should read --outwards of--;
Col. 6, line 58, "meber" should read --member--;
Col. 7, line 56, "unit member" should read --unit input member--;
Col. 15, line 53, "is" should read --it is--;
Col. 17, line 45, "ritual" should read --virtual--;
Col. 18, line 60, "sucured" should read --secured--;
Col. 22, line 10, "an" should read --of an--;
Col. 33, line 64, "the the" should read --the--;
Col. 39, line 68, "claim 52" should read --claim 51--;
Col. 40, line 20, "in claim" should read --in claim 54--;
Col. 41, line 26, "being" should read --being a--;
Col. 41, line 44, "9ear" should read --gear--;
Col. 41, line 44, "163, 129" should read --165, 125--;
Col. 41, line 61, "(1217" should read --(121)--;
Col. 44, line 8, "(10b)" should read --(105)--;
Col. 46, line 51, "claim 147" should read --claim 92--.

Signed and Sealed this

Fourth Day of April, 1995

BRUCE LEHMAN

Attest:

Attesting Officer      Commissioner of Patents and Trademarks